US011894012B2

(12) United States Patent
Zheng et al.

(10) Patent No.: US 11,894,012 B2
(45) Date of Patent: Feb. 6, 2024

(54) NEURAL-NETWORK-BASED APPROACH FOR SPEECH DENOISING

(71) Applicants: The Trustees of Columbia University in the City of New York, New York, NY (US); SoftBank Corp., Tokyo (JP)

(72) Inventors: Changxi Zheng, New York, NY (US); Ruilin Xu, New York, NY (US); Rundi Wu, New York, NY (US); Carl Vondrick, New York, NY (US); Yuko Ishiwaka, Tokyo (JP)

(73) Assignees: The Trustees of Columbia University in the City of New York; SoftBank Corp., Tokyo (JP)

( * ) Notice: Subject to any disclaimer, the term of this patent is extended or adjusted under 35 U.S.C. 154(b) by 0 days.

(21) Appl. No.: 18/320,206

(22) Filed: May 19, 2023

(65) Prior Publication Data

US 2023/0306981 A1 Sep. 28, 2023

Related U.S. Application Data

(63) Continuation of application No. PCT/JP2021/027243, filed on Jul. 20, 2021.

(Continued)

(51) Int. Cl.
*G10L 21/0232* (2013.01)
*G10L 25/30* (2013.01)

(Continued)

(52) U.S. Cl.
CPC .......... *G10L 21/0232* (2013.01); *G10L 25/30* (2013.01); *G10L 25/18* (2013.01); *G10L 2021/02168* (2013.01)

(58) Field of Classification Search
CPC ..... G10L 21/0232; G10L 25/30; G10L 25/18; G10L 2021/02168; G10L 704/232
See application file for complete search history.

(56) References Cited

U.S. PATENT DOCUMENTS 10,134,425 B1 * 11/2018 Johnson, Jr. ............ G10L 15/05
10,210,860 B1 * 2/2019 Ward ...................... G10L 25/18

(Continued)

FOREIGN PATENT DOCUMENTS

| | | | |
|---|---|---|---|
| JP | H02253298 | A | 10/1990 |
| JP | H06282297 | A | 10/1994 |
| WO | 2022107393 | A1 | 5/2022 |

OTHER PUBLICATIONS

International Search Report and (ISA/237) Written Opinion of the International Search Authority for International Patent Application No. PCT/JP2021/027243, mailed by the Japan Patent Office dated Oct. 19, 2021.

(Continued)

*Primary Examiner* — Fariba Sirjani

(57) ABSTRACT

Disclosed are methods, systems, device, and other implementations, including a method that includes receiving an audio signal representation, detecting in the received audio signal representation, using a first learning model, one or more silent intervals with reduced foreground sound levels, determining based on the detected one or more silent intervals an estimated full noise profile corresponding to the audio signal representation, and generating with a second learning model, based on the received audio signal representation and on the determined estimated full noise profile, a resultant audio signal representation with a reduced noise level.

8 Claims, 9 Drawing Sheets

Related U.S. Application Data

(60) Provisional application No. 63/116,400, filed on Nov. 20, 2020.

(51) Int. Cl.
*G10L 21/0216* (2013.01)
*G10L 25/18* (2013.01)

(56) References Cited

U.S. PATENT DOCUMENTS

| | | | | |
|---|---|---|---|---|
| 10,923,139 | B2 * | 2/2021 | Shen | H04L 51/222 |
| 11,127,394 | B2 * | 9/2021 | Czyryba | G10L 15/02 |
| 2005/0182624 | A1 * | 8/2005 | Wu | G10L 21/0208 704/233 |
| 2007/0021958 | A1 * | 1/2007 | Visser | G10L 25/78 704/226 |
| 2007/0198268 | A1 * | 8/2007 | Hennecke | G10L 15/22 704/E15.04 |
| 2017/0092268 | A1 * | 3/2017 | Kristjansson | G10L 15/16 |
| 2019/0043529 | A1 * | 2/2019 | Muchlinski | G10L 15/22 |
| 2020/0066296 | A1 * | 2/2020 | Sargsyan | G10L 21/0232 |
| 2020/0074997 | A1 * | 3/2020 | Jankowski, Jr. | G06N 3/045 |
| 2020/0075033 | A1 * | 3/2020 | Hijazi | G06N 3/086 |
| 2020/0090682 | A1 * | 3/2020 | Liu | G06N 3/08 |
| 2020/0312342 | A1 * | 10/2020 | Shanmugam | G10L 21/0216 |
| 2020/0395042 | A1 * | 12/2020 | Hanazawa | G06N 3/045 |
| 2021/0020191 | A1 * | 1/2021 | Venneti | G10L 21/0208 |
| 2021/0110838 | A1 * | 4/2021 | Nemala | G10L 15/063 |
| 2021/0174791 | A1 * | 6/2021 | Shen | G06N 3/04 |
| 2021/0193175 | A1 * | 6/2021 | Lee | G10L 25/84 |
| 2021/0203295 | A1 * | 7/2021 | Mahadeva | G10L 25/51 |
| 2021/0335340 | A1 * | 10/2021 | Gowayyed | G10L 25/30 |
| 2021/0360349 | A1 * | 11/2021 | Nyayate | G06N 3/084 |
| 2022/0092389 | A1 * | 3/2022 | Elkhatib | G06N 3/08 |

OTHER PUBLICATIONS

Changxi Zheng et al., Listening to Sounds of Silence for Speech Denoising, 2020 Conference on Neural Information Processing Systems, Oct. 22, 2020, p. 1-p. 15.

Changxi Zheng et al., Supplementary Document Listening to Sounds of Silence for Speech Denoising, 2020 Conference on Neural Information Processing Systems, Oct. 22, 2020, p. 1-p. 6.

* cited by examiner

NEURAL-NETWORK-BASED APPROACH FOR SPEECH DENOISING

THE CONTENTS OF THE FOLLOWING PATENT APPLICATION(S) ARE INCORPORATED HEREIN BY REFERENCE

NO. 63/116,400 filed in US on Nov. 20, 2020,
NO. PCT/JP2021/027243 filed in WO on Jul. 20, 2021

BACKGROUND

1. Technical Field

This invention was made with government support under Grant Nos. 1910839, 1453101, and 1850069 awarded by the National Science Foundation (NFS), and under a contract awarded by the Knowledge-directed Artificial Intelligence Reasoning Over Schemas (KAIROS) program run by the Defense Advanced Research Projects Agency (DARPA). The government has certain rights in the invention.

2. Related Art

Audio recordings of human speech are often contaminated with noise from various sources. Some noise in recordings may be stationary, while other noise may fluctuate in frequency and amplitude throughout the recording. This latter noise, called nonstationary noise, is difficult to remove from audio recordings.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DESCRIPTION OF EXEMPLARY EMBODIMENTS

Figure 1:
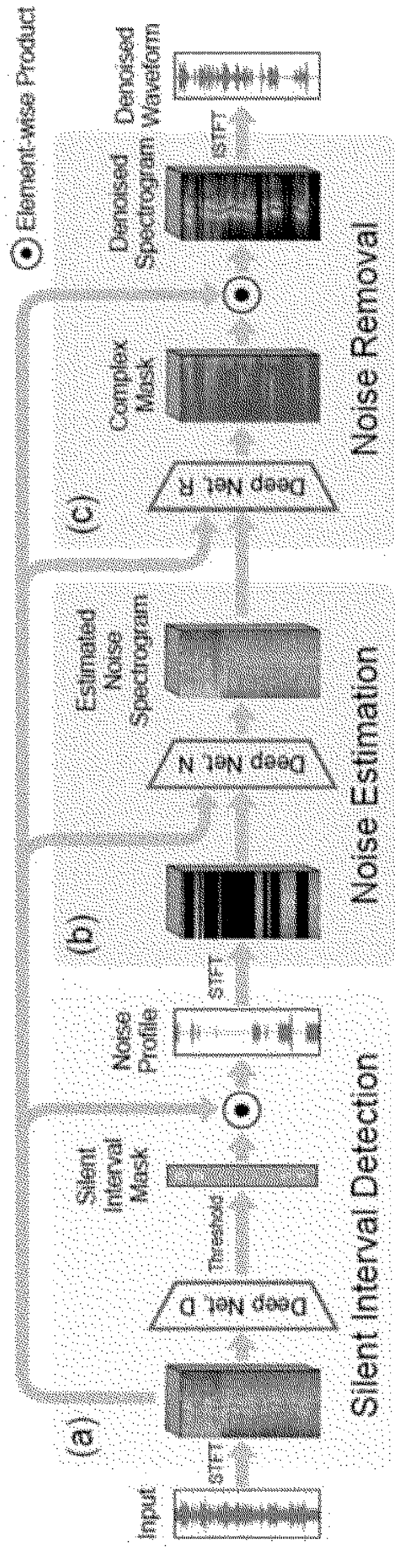
FIG. 1 A network structure.

Disclosed are systems, methods, and other implementations (including hardware, software, and hybrid hardware/software implementations) directed at a speech denoising framework that leverages the abundance of silent intervals in speech to learn a model for automatic speech denoising given only mono-channel audio. The implementations described herein are based on a deep neural network for speech denoising approach that tightly integrates silent intervals, and thereby overcomes many of the limitations of classical approaches. The goal is not just to identify a single silent interval, but to find as many as possible silent intervals over time. Indeed, silent intervals in speech appear in abundance: psycholinguistic studies have shown that there is almost always a pause after each sentence and even after each word in speech. Each pause, however short, provides a silent interval revealing noise characteristics local in time. Altogether, these silent intervals assemble a time-varying picture of background noise, allowing a neural network to better denoise speech signals, even in presence of nonstationary noise.

The technology described herein uses a neural network architecture based on long short-term memory (LSTM) structures to reliably denoise vocal recordings (other learning machine architectures/structures may also be used). To do this, the LSTM is trained on noise obtained from intermittent gaps in speech called silent intervals, which it automatically identifies in the recording. The silent intervals contain a combination of stationary and nonstationary noise, and thus the spectral distributions of noise during these silent intervals can be used in denoising. LSTM is capable of removing the stationary and nonstationary spectra in the vocal intervals to provide a robustly denoised, high quality speech recording. This technology is also applicable to audio recording, filmmaking, and speech-to-text applications.

To interleave neural networks with established denoising pipelines, a network structure is proposed that includes three major components (illustrated in FIG. 1): i) a component dedicated to silent interval detection, ii) another component to estimate the full noise from those revealed in silent intervals, akin to an inpainting process in computer vision, and iii) another component to clean up the input signal.

More particularly, the silent interval detection component is configured to detect silent intervals in the input signal. The input to this component is the spectrogram of the input (noisy) signal x. The spectrogram $S_x$ is first encoded by a 2D convolutional encoder into a 2D feature map, which, in turn, is processed by a bidirectional LSTM followed by two fully-connected (FC) layers. The bidirectional LSTM is suitable for processing time-series features resulting from the spectrogram, and the FC layers are applied to the features of each time sample to accommodate variable length input. The output from this network component is a vector $D(S_x)$. Each element of $D(S_x)$ is a scalar in [0,1] (after applying the sigmoid function), indicating a confidence score of a small-time segment being silent. In some examples, each time segment has a duration of 1/30 second, which is small enough to capture short speech pauses and large enough to allow robust prediction. The output vector $D(S_x)$ is then expanded to a longer mask, denoted m(x). Each element of this mask indicates the confidence of classifying each sample of the input signal x as pure noise. With this mask, the noise profile $\tilde{x}$ exposed by silent intervals are estimated by an element-wise product, namely $$\tilde{x}=x\odot m(x).$$

In the noise estimation component/module, the signal $\tilde{x}$ resulting from silent interval detection is noise profile exposed only through a series of time windows, but not a complete picture of the noise. However, since the input signal is a superposition of clean speech signal and noise, having a complete noise profile would ease the denoising process, especially in presence of nonstationary noise. Therefore, the entire noise profile over time is estimated, which is achieved, in some implementations, using a neural network. Inputs to this component include both the noisy audio signal representation x and the incomplete noise profile $\tilde{x}$.

Both are converted by STFT into spectrograms, denoted as $s_x$ and $s_{\tilde{x}}$, respectively. The spectrograms can be thought of as 2D images. Because the neighboring time-frequency pixels in a spectrogram are often correlated, the goal here is conceptually akin to the image inpainting task in computer vision. To this end, $s_x$ and $s_{\tilde{x}}$ are encoded by two separate 2D convolutional encoders into two feature maps. The feature maps are then concatenated in a channel-wise manner and further decoded by a convolutional decoder to estimate the full noise spectrogram, denoted $$N(s_x,s_{\tilde{x}}).$$

Lastly, the noise from the input signal x is cleaned up using the noise removal component/module. A neural network R receives as input both the input audio spectrogram $S_x$ and the estimated full noise spectrogram $$N(s_x,s_{\tilde{x}}).$$

The two input spectrograms are processed individually by their own 2D convolutional encoders. The two encoded feature maps are then concatenated together before passing to a bidirectional LSTM, followed by three fully connected layers. The output of this component is a vector with two channels which form the real and imaginary parts of a complex ratio mask $$c:=R(s_x,N(s_x,s_{\tilde{x}}))$$

in frequency-time domain. In other words, the mask c has the same (temporal and frequency) dimensions as $S_x$. In a final step, the denoised spectrogram $S_x^*$ is computed through element-wise multiplication of the input audio spectrogram $S_x$ and the mask $$c(\text{i.e., } s_x^*=s_x\odot c).$$

Finally, the cleaned-up audio signal representation is obtained by applying the inverse STFT (ISTFT) to $S_x^*$ Since a subgradient exists at every step, in some embodiments, the network can be trained in an end-to-end fashion with a stochastic gradient descent approach. The following loss function is optimized:

$$L_0=E_{x-(x)}[\|N(s_x,s_{\tilde{x}})-s_n^*\|_2+\beta\|s_x\odot R(s_x,N(s_x,s_{\tilde{x}}))-s_x^*\|_2],$$

where the notations $s_x$, $s_{\tilde{x}}$, N(•,•), and R(•,•)

are as defined above, $s_x^*$ and $s_n^*$ denote the spectrograms of the ground-truth foreground signal and background noise, respectively. The first term penalizes the discrepancy between estimated noise and the ground-truth noise, while the second term accounts for the estimation of foreground signal. These two terms are balanced by the scalar $\beta$($\beta$=1.0 in some examples).

While producing plausible denoising results, the end-to-end training process has no supervision on silent interval detection: the loss function only accounts for the recoveries of noise and clean speech signal. However, somewhat surprisingly, the ability of detecting silent intervals automatically emerges as the output of the first network component. In other words, the network automatically learns to detect silent intervals for speech denoising without this supervision.

As the model is learning to detect silent intervals on its own, silent detection can be directly supervised to further improve the denoising quality. To that end, a term can be added to the above loss function that penalizes the discrepancy between detected silent intervals and their ground truth. Experiments showed that this way is not effective, so instead the model is trained in two sequential steps. First, the silent interval detection component is computed through the following loss function:

$$L_1=E_{x,p(x)}[\ell_{BCE}(m(x),m_x^*)],$$

where $I_{BCE}$ is the binary cross-entropy loss, m(x) is the mask resulted from silent interval detection component, and $m_x^*$ is the ground-truth label of each signal sample being silent or not.

Next, the noise estimation and removal components are trained through the loss function $L_0$. This training step starts by neglecting the silent detection component. In the loss function $L_0$, instead of using $S_{\tilde{x}}$, the noise spectrogram exposed by the estimated silent intervals, the spectrogram of the noise exposed by the ground-truth silent intervals (i.e., the STFT of $x\odot m_{\tilde{x}^*}$)

is used. After training using such a loss function, the network components are fine-tuned by incorporating the already trained silent interval detection component. With the silent interval detection component fixed, this fine-tuning step optimizes the original loss function $L_0$ and thereby updates the weights of the noise estimation and removal components.

Thus, in some embodiments, a system is provided that includes a receiver unit (e.g., a microphone, a communication module to receive electronic signal representations of audio/sound, etc.) to receive an audio signal representation, and a controller (e.g., a programmable device), implementing one or more learning engines, in communication with the receiver unit and a memory device to store programmable instructions, to detect in the received audio signal representation, using a first learning model, one or more silent intervals with reduced foreground sound levels, determine based on the detected one or more silent intervals an estimated full noise profile corresponding to the audio signal representation, and generate with a second learning model, based on the received audio signal representation and on the determined estimated full noise profile, a resultant audio signal representation with a reduced noise level. In some implementations, a non-transitory computer readable media is provided, that stores a set of instructions, executable on at least one programmable device, to receive an audio signal representation, detect in the received audio signal representation, using a first learning model, one or more silent intervals with reduced foreground sound levels, determine based on the detected one or more silent intervals an estimated full noise profile corresponding to the audio signal representation, and generate with a second learning model, based on the received audio signal representation and on the determined estimated full noise profile, a resultant audio signal representation with a reduced noise level.

In some implementations, a method is provided that includes receiving an audio signal representation, detecting in the received audio signal representation, using a first learning model, one or more silent intervals with reduced foreground sound levels, determining based on the detected one or more silent intervals an estimated full noise profile corresponding to the audio signal representation, and generating with a second learning model, based on the received audio signal representation and on the determined estimated full noise profile, a resultant audio signal representation with a reduced noise level.

In some examples, detecting using the first learning model the one or more silent intervals may include segmenting the audio signal representation into multiple segments, each segment being shorter than an interval length of the received audio signal representation, transforming the multiple segments into a time-frequency representation, and processing the time-frequency representation of the multiple segments using a first learning machine, implementing the first learning model, to produce a noise vector that includes, for each of the multiple segments, a confidence value representative of a likelihood that the respective one of the multiple segments is a silent interval. In such examples, processing the time-frequency representation may include encoding the time-frequency representation of the multiple segment with a 2D convolutional encoder to a generate a 2D feature map, applying a learning network structure, comprising at least a bidirectional long short-term memory (LSTM) structure, to the 2D feature map to produce the silence vector, determining a noise mask from the silence vector, and generating based on the audio signal representation and the noise mask a partial noise profile for the audio signal representation.

In some embodiments, determining the estimated full noise profile may include generating a partial noise profile representative of time-frequency characteristics of the detected one or more silent intervals, transforming the audio signal representation and the partial noise profile into respective time-frequency representations, applying convolutional encoding to the time-frequency representations of the audio signal representation and the partial noise profile to produce an encoded audio signal representation and encoded partial noise profile, and combining the encoded audio signal representation and the encoded partial noise profile to produce the estimated full noise profile. In some examples, generating the resultant audio signal representation with the reduced noise level may include generating time-frequency representations for the audio signal representation and the estimated full noise profile, and applying the second learning model to the time-frequency representations for the audio signal representation and the estimated full noise profile to generate the resultant audio signal representation. The second learning model may be implemented with a bidirectional long short-term memory (LSTM) structure.

As noted, implementation of the denoising processing described herein may be realized using one or more learning machines (such as neural networks). Neural networks are in general composed of multiple layers of linear transformations (multiplications by a "weight" matrix), each followed by a nonlinear function (e.g., a rectified linear activation function, or ReLU, etc.) The linear transformations are learned during training by making small changes to the weight matrices that progressively make the transformations more helpful to the final classification task (or some other type of desired output). The layered network may include convolutional processes which are followed by pooling processes along with intermediate connections between the layers to enhance the sharing of information between the layers. Several examples of learning engine approaches/architectures that may be used include generating an auto-encoder and using a dense layer of the network to correlate with probability for a future event through a support vector machine, or constructing a regression or classification neural network model that predicts a specific output from input data (based on training reflective of correlation between similar input and the output that is to predicted).

Examples of neural networks include convolutional neural network (CNN), feed-forward neural networks, recurrent neural networks (RNN, e.g., implemented, for example, using long short-term memory (LSTM) structures), etc. Feed-forward networks include one or more layers of learning nodes/elements with connections to one or more portions of the input data. In a feedforward network, the connectivity of the inputs and layers of learning elements is such that input data and intermediate data propagate in a forward direction towards the network's output. There are typically no feedback loops or cycles in the configuration/structure of the feed-forward network. Convolutional layers allow a network to efficiently learn features by applying the same learned transformation to subsections of the data. In some embodiments, the various learning processes implemented through use of the learning machines may be realized using keras (an open-source neural network library) building blocks and/or NumPy (an open-source programming library useful for realizing modules to process arrays) building blocks.

In some embodiments, the various learning engine implementations may include a trained learning engine (e.g., a neural network) and a corresponding coupled learning engine controller/adapter configured to determine and/or adapt the parameters (e.g., neural network weights) of the learning engine that would produce desired output. In such implementations, training data includes sets of input records along with corresponding data defining the ground truth for the input training records. After initial training of the various learning engines comprising the systems described herein, subsequent training may be intermittently performed (at regular or irregular periods). Upon completion of a training cycles by the adapter/controller coupled to a particular learning engine, the adapter provides data representative of updates/changes (e.g., in the form of parameter values/weights to be assigned to links of a neural-network-based learning engine) to the particular learning engine to cause the learning engine to be updated in accordance with the training cycle(s) completed.

Performing the various techniques and operations described herein may be facilitated by a controller device (e.g., a processor-based computing device) that may be realized as part of a verbal communication device (such as a hearing aid device). Such a controller device may include a processor-based device such as a computing device, and so forth, that typically includes a central processor unit or a processing core. The device may also include one or more dedicated learning machines (e.g., neural networks) that may be part of the CPU or processing core. In addition to the CPU, the system includes main memory, cache memory and bus interface circuits. The controller device may include a mass storage element, such as a hard drive (solid state hard drive, or other types of hard drive), or flash drive associated with the computer system. The controller device may further include a keyboard, or keypad, or some other user input interface, and a monitor, e.g., an LCD (liquid crystal display) monitor, that may be placed where a user can access them.

The controller device is configured to facilitate, for example, the implementation of de-noising processing. The storage device may thus include a computer program product that when executed on the controller device (which, as noted, may be a programmable or processor-based device) causes the processor-based device to perform operations to facilitate the implementation of procedures and operations described herein. The controller device may further include peripheral devices to enable input/output functionality. Such peripheral devices may include, for example, flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, a graphics processing unit (GPU), accelerated processing unit (APU), application processing unit, etc., may be used in the implementations of the controller device. Other modules that may be included with the controller device may include a user interface to provide or receive input and output data. Additionally, in some embodiments, sensor devices such as a microphone, a light-capture device (e.g., a CMOS-based or CCD-based camera device), other types of optical or electromagnetic sensors, sensors for measuring environmental conditions, etc., may be coupled to the controller device, and may be configured to observe or measure the signals or data to be processed. The controller device may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The presently disclosed subject matter is further described in the materials appended hereto. Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

(Listening to Sounds of Silence for Speech Denoising)

In this embodiment, we introduce a deep learning model for speech denoising, a long-standing challenge in audio analysis arising in numerous applications. Our approach is based on a key observation about human speech: there is often a short pause between each sentence or word. In a recorded speech signal, those pauses introduce a series of time periods during which only noise is present. We leverage these incidental Silent intervals to learn a model for automatic speech denoising given only mono-channel audio. Detected silent intervals over time expose not just pure noise but its time-varying features, allowing the model to learn noise dynamics and suppress it from the speech signal. Experiments on multiple datasets confirm the pivotal role of silent interval detection for speech denoising, and our method outperforms several state-of-the-art denoising methods, including those that accept only audio input (like ours) and those that denoise based on audiovisual input (and hence require more information). We also show that our method enjoys excellent generalization properties, such as denoising spoken languages not seen during training.

(1 Introduction)

Noise is everywhere. When we listen to someone speak, the audio signals we receive are never pure and clean, always contaminated by all kinds of noises-cars passing by, spinning fans in an air conditioner, barking dogs, music from a loudspeaker, and so forth. To a large extent, people in a conversation can effortlessly filter out these noises (Ref. 40). In the same vein, numerous applications, ranging from cellular communications to human-robot interaction, rely on speech denoising algorithms as a fundamental building block.

Despite its vital importance, algorithmic speech denoising remains a grand challenge. Provided an input audio signal, speech denoising aims to separate the foreground (speech) signal from its additive background noise. This separation problem is inherently ill-posed. Classic approaches such as spectral subtraction (Ref. 7, 91, 6, 66, 73) and Wiener filtering (Ref. 74, 38) conduct audio denoising in the spectral domain, and they are typically restricted to stationary or quasi-stationary noise. In recent years, the advance of deep neural networks has also inspired their use in audio denoising. While outperforming the classic denoising approaches, existing neural-network-based approaches use network structures developed for general audio processing tasks (Ref. 51, 83, 93) or borrowed from other areas such as computer vision (Ref. 29, 24, 3, 34, 30) and generative adversarial networks (Ref. 64, 65). Nevertheless, beyond reusing well-developed network models as a black box, a fundamental question remains: What natural Structures of Speech can we leverage to mold network architectures for better performance on Speech denoising.

(1.1 Key Insight: Time Distribution of Silent Intervals)

Motivated by this question, we revisit one of the most widely used audio denoising methods in practice, namely the spectral subtraction method (Ref. 7, 91, 6, 66, 73). Implemented in many commercial software such as Adobe Audition (Ref. 37), this classical method requires the user to specify a time interval during which the foreground signal is absent. We call such an interval a Silent interval. A silent interval is a time window that exposes pure noise. The algorithm then learns from the silent interval the noise characteristics, which are in turn used to suppress the additive noise of the entire input signal (through subtraction in the spectral domain).

Figure 2:
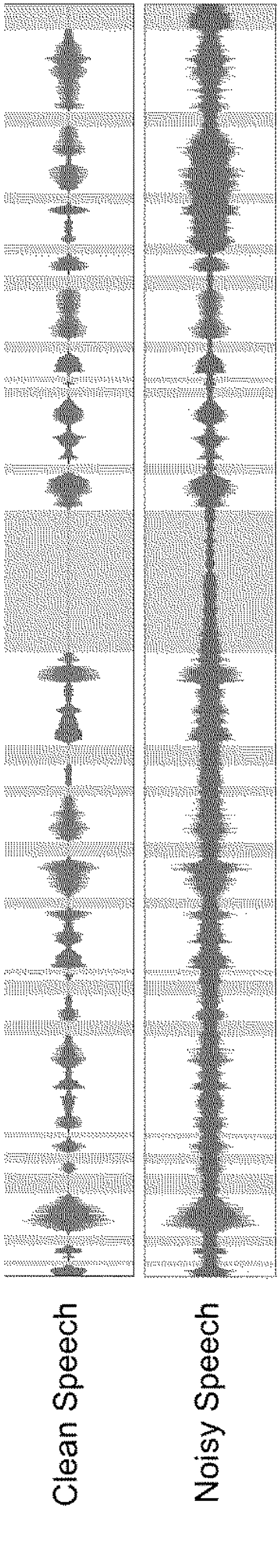
FIG. 2 Silent intervals over time.

FIG. 2: Silent intervals over time. (top) A speech signal has many natural pauses. Without any noise, these pauses are exhibited as silent intervals (highlighted in red). (bottom) However, most speech signals are contaminated by noise. Even with mild noise, silent intervals become overwhelmed and hard to detect. If robustly detected, silent intervals can help to reveal the noise profile over time.

Submitted to 34th Conference on Neural Information Processing Systems (NeurIPS 2020). Do not distribute. Yet, the spectral subtraction method suffers from two major shortcomings: i) it requires user specification of a silent interval, that is, not fully automatic; and ii) the single silent interval, although undemanding for the user, is insufficient in presence of nonstationary noise—for example, a background music. Ubiquitous in daily life, nonstationary noise has time-varying spectral features. The single silent interval reveals the noise spectral features only in that particular time span, thus inadequate for denoising the entire input signal. The success of spectral subtraction pivots on the concept of silent interval; so do its shortcomings.

In this embodiment, we introduce a deep network for speech denoising that tightly integrates silent intervals, and thereby overcomes many of the limitations of classical approaches. Our goal is not just to identify a single silent interval, but to find as many as possible silent intervals over time. Indeed, silent intervals in speech appear in abundance: psycholinguistic studies have shown that there is almost always a pause after each sentence and even each word in speech (Ref. 72, 21). Each pause, however short, provides a silent interval revealing noise characteristics local in time. All together, these silent intervals assemble a time-varying picture of background noise, allowing the neural network to better denoise speech signals, even in presence of nonstationary noise (see FIG. 2).

In short, to interleave neural networks with established denoising pipelines, we propose a network structure consisting of three major components (see FIG. 1): i) one dedicated to silent interval detection, ii) another that aims to estimate the full noise from those revealed in silent intervals, akin to an inpainting process in computer vision (Ref. 36), and iii) yet another for cleaning up the input signal.

Summary of results. Our neural-network-based denoising model accepts a single channel of audio signal and outputs the cleaned-up signal. Unlike some of the recent denoising methods that take as input audiovisual signals (i.e., both audio and video footage), our method can be applied in a wider range of scenarios (e.g., in cellular communication). We conducted extensive experiments, including ablation studies to show the efficacy of our network components and comparisons to several state-of-the-art denoising methods. We also evaluate our method under various signal-to-noise ratios-even under strong noise levels that are not tested against in previous methods. We show that, under a variety of denoising metrics, our method consistently outperforms those methods, including those that accept only audio input (like ours) and those that denoise based on audiovisual input.

The pivotal role of silent intervals for speech denoising is further confirmed by a few key results. Even without supervising on silent interval detection, the ability to detect silent intervals naturally emerges in our network. Moreover, while our model is trained on English speech only, with no additional training it can be readily used to denoise speech in other languages (such as Chinese, Japanese, and Korean). Please refer to the supplementary materials for listening to our denoising results.

(2 Related Work)

Speech denoising. Speech denoising (Ref. 48) is a fundamental problem studied over several decades. Spectral subtraction (Ref. 7, 91, 6, 66, 73) estimates the clean signal spectrum by subtracting an estimate of the noise spectrum from the noisy speech spectrum. This classic method was followed by spectrogram factorization methods (Ref. 78). Wiener filtering (Ref. 74, 38) derives the enhanced signal by optimizing the mean-square error. Other methods exploit pauses in speech, forming segments of low acoustic energy where noise statistics can be more accurately measured (Ref. 13, 52, 79, 15, 69, 10, 11). Statistical model-based methods (Ref. 14, 32) and subspace algorithms (Ref. 12, 16) are also studied.

Applying neural networks to audio denoising dates back to the 80s (Ref. 81, 63). With increased computing power, deep neural networks are often used (Ref. 97, 99, 98, 42). Long short-term memory networks (LSTMs) (Ref. 33) are able to preserve temporal context information of the audio signal (Ref. 47), leading to strong results (Ref. 51, 83, 93). Leveraging generative adversarial networks (GANs) (Ref. 31), methods such as (Ref. 64, 65) have adopted GANs into the audio field and have also achieved strong performance.

Audio signal processing methods operate on either the raw waveform or the spectrogram by Short-time Fourier Transform (STFT). Some work directly on waveform (Ref. 22, 62, 54, 50), and others use Wavenet (Ref. 84) for speech denoising (Ref. 68, 70, 28). Many other methods such as (Ref. 49, 87, 56, 92, 41, 100, 9) work on audio signal's spectrogram, which contains both magnitude and phase information. There are works discussing how to use the spectrogram to its best potential (Ref. 86, 61), while one of the disadvantages is that the inverse STFT needs to be applied. Meanwhile, there also exist works (Ref. 46, 27, 26, 88, 19, 94, 55) investigating how to overcome artifacts from time aliasing.

Speech denoising has also been studied in conjunction with computer vision due to the relations between speech and facial features (Ref. 8). Methods such as (Ref. 29, 24, 3, 34, 30) utilize different network structures to enhance the audio signal to the best of their ability. Adeel et al. (Ref. 1) even utilize lip-reading to filter out the background noise of a speech.

Deep learning for other audio processing tasks. Deep learning is widely used for lip reading, speech recognition, speech separation, and many audio processing or audio-related tasks, with the help of computer vision (Ref. 58, 60, 5, 4). Methods such as (Ref. 45, 17, 59) are able to reconstruct speech from pure facial features. Methods such as (Ref. 2, 57) take advantage of facial features to improve speech recognition accuracy. Speech separation is one of the areas where computer vision is best leveraged. Methods such as (Ref. 23, 58, 18, 102) have achieved impressive results, making the previously impossible speech separation from a single audio signal possible. Recently, Zhang et al. (Ref. 101) proposed a new operation called Harmonic Convolution to help networks distill audio priors, which is shown to even further improve the quality of speech separation.

(3 Learning Speech Denoising)

We present a neural network that harnesses the time distribution of silent intervals for speech denoising. The input to our model is a spectrogram of noisy speech (Ref. 96, 20, 77), which can be viewed as a 2D image of size T×F with two channels, where T represents the time length of the signal and F is the number of frequency bins. The two channels store the real and imaginary parts of STFT, respectively. After learning, the model will produce another spectrogram of the same size as the noise suppressed.

We first train our proposed network structure in an end-to-end fashion, with only denoising super-vision (Sec. 3.2); and it already outperforms the state-of-the-art methods that we compare against. Furthermore, we incorporate the supervision on silent interval detection (Sec. 3.3) and obtain even better denoising results (see Sec. 4).

(3.1 Network Structure)

Classic denoising algorithms work in three general stages: silent interval specification, noise feature estimation, and noise removal. We propose to interweave learning throughout this process: we rethink each stage with the help of a neural network, forming a new speech denoising model. Since we can chain these networks together and estimate gradients, we can efficiently train the model with large-scale audio data. FIG. 1 illustrates this model, which we describe below.

Silent interval detection. The first component is dedicated to detecting silent intervals in the input signal. The input to this component is the spectrogram of the input (noisy) signal x. The spectrogram $S_x$ is first encoded by a 2D convolutional encoder into a 2D feature map, which is in turn processed by a bidirectional LSTM (Ref. 33, 75) followed by two fully-connected (FC) layers (see network details in the following A). The bidirectional LSTM is suitable for processing time-series features resulting from the spectrogram (Ref. 53, 39, 67, 18), and the FC layers are applied to the features of each time sample to accommodate variable length input. The output from this network component is a vector $D(S_x)$. Each element of $D(S_x)$ is a scalar in [0,1] (after applying the sigmoid function), indicating a confidence score of a small time segment being silent. We choose each time segment to have 1/30 second, small enough to capture short speech pauses and large enough to allow robust prediction (see Sec. 3.3).

Figure 3:
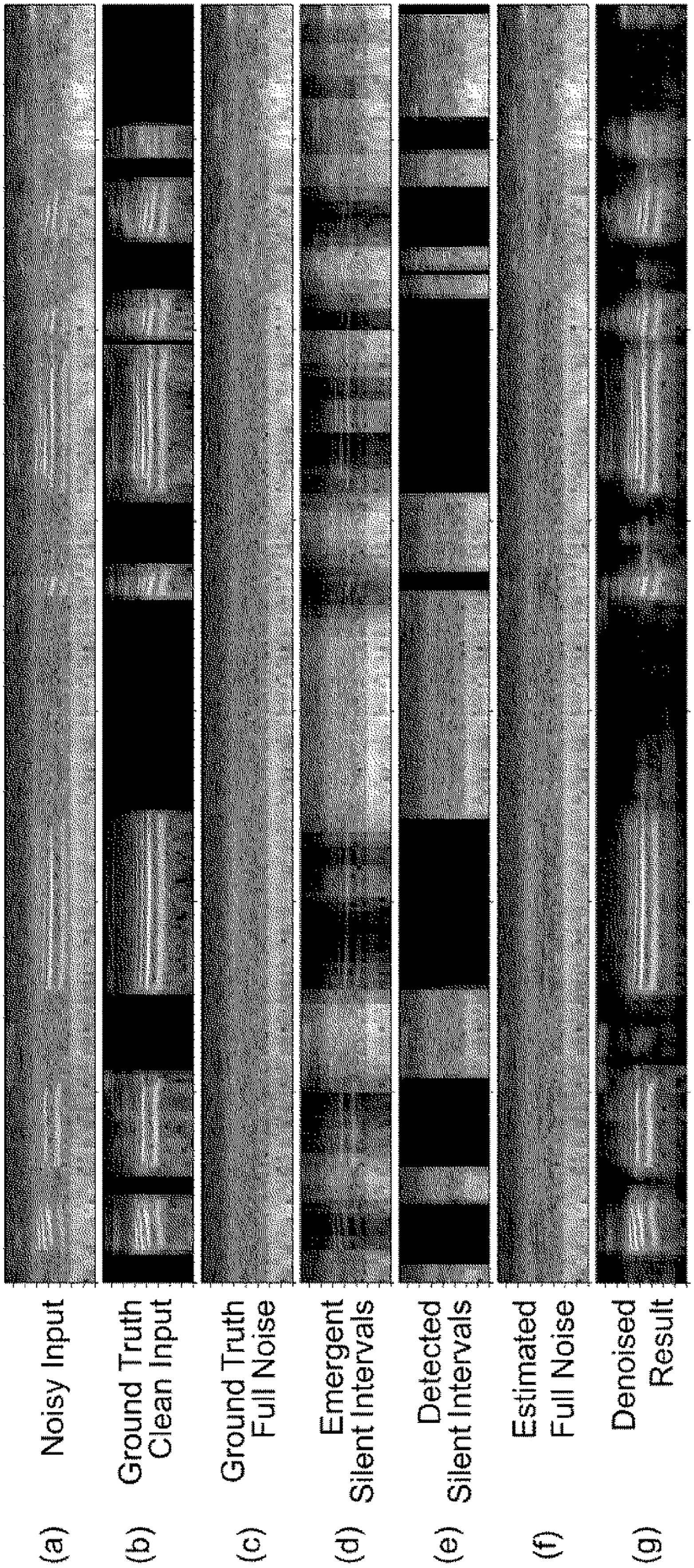
FIG. 3 Example of intermediate and final results
FIG. 4 Noise gallery
FIG. 5 Quantitative comparisons
FIG. 6 Denoise quality w.r.t input SNRs
FIG. 7 Constructed noisy audio based on different SNR levels
FIG. 8 Denoise quality under different input SNRs
FIG. 9 An example of Silent Interval Detection

FIG. 3: Example of intermediate and final results. (a) The spectrogram of a noisy input signal, which is a superposition of a clean speech signal (b) and a noise (c). The black regions in (b) indicate ground-truth silent intervals. (d) The noise exposed by automatically emergent silent intervals, i.e., the output of the silent interval detection component when the entire network is trained without silent interval supervision (recall Sec. 3.2). (e) The noise exposed by detected silent intervals, i.e., the output of the silent interval detection component when the network is trained with silent interval supervision (recall Sec. 3.3). (f) The estimated noise profile using subfigure (a) and (e) as the input to the noise estimation component. (g) The final denoised spectrogram output.

The output vector $D(S_x)$ is then expanded to a longer mask, which we denote as m(x). Each element of this mask indicates the confidence of classifying each sample of the input signal x as pure noise (see FIG. 3-*e*). With this mask, the noise profile $\tilde{x}$ exposed by silent intervals are estimated by an element-wise product, namely $$\tilde{x}=x\odot m(x).$$

Noise estimation.

The signal $\tilde{x}$ resulted from silent interval detection is noise profile exposed only through a series of time windows (see FIG. 3-*e*)—but not a complete picture of the noise. However, since the input signal is a superposition of clean speech signal and noise, having a complete noise profile would ease the denoising process, especially in presence of nonstationary noise. Therefore, we also estimate the entire noise profile over time, which we do with a neural network.

Inputs to this component include both the noisy audio signal at and the incomplete noise profile $\tilde{x}$. Both are converted by STFT into spectrograms, denoted as $s_x$ and $s_{\tilde{x}}$, respectively. We view the spectrograms as 2D images. And because the neighboring time-frequency pixels in a spectrogram are often correlated, our goal here is conceptually akin to the image inpainting task in computer vision (Ref. 36). To this end, we encode $s_x$ and $s_{\tilde{x}}$, by two separate 2D convolutional encoders into two feature maps. The feature maps are then concatenated in a channel-wise manner and further decoded by a convolutional decoder to estimate the full noise spectrogram, denoted as $$N(s_x,s_{\tilde{x}}).$$

A result of this step is illustrated in FIG. 3-*f*.

Noise removal. Lastly, we clean up the noise from the input signal x. We use a neural network R that takes as input both the input audio spectrogram $S_x$ and the estimated full noise spectrogram $$N(s_x,s_{\tilde{x}}).$$

The two input spectrograms are processed individually by their own 2D convolutional encoders. The two encoded feature maps are then concatenated together before passing to a bidirectional LSTM followed by three fully connected layers. (see details in the following A). Like other audio enhancement models (Ref. 18, 85, 89), the output of this component is a vector with two channels which form the real and imaginary parts of a complex ratio mask $$c:=R(s_x,N(s_x,s_{\tilde{x}}))$$

in frequency-time domain. In other words, the mask c has the same (temporal and frequency) dimensions as $S_x$.

In a final step, the denoised spectrogram $s_x^*$ through element-wise multiplication of the input audio spectrogram $S_x$ and the mask $$c(\text{i.e., } s_x^*=s_x\odot c).$$

Finally, the cleaned-up audio signal representation is obtained by applying the inverse STFT to $s_x^*$ (see FIG. 3-*g*).

(3.2 Loss Functions and Training)

Since a subgradient exists at every step, we are able to train our network in an end-to-end fashion with stochastic gradient descent. We optimize the following loss function:

$$\mathcal{L}_0=\mathbb{E}_{x\sim p(x)}[\|N(s_x,s_{\tilde{x}})-s_n^*\|_2+\beta\|s_x\odot R(s_x,N(s_x,s_{\tilde{x}}))-s_x^*\|_2]. \quad (1)$$

where the notations $s_x$, $s_{\tilde{x}}$, $N(\cdot,\cdot)$, and $R(\cdot,\cdot)$ are defined in Sec. 3.1; $s_x^*$ and $s_n^*$ denote the spectrograms of the ground-truth foreground signal and background noise, respectively. The first term penalizes the discrepancy between estimated noise and the ground-truth noise, while the second term accounts for the estimation of foreground signal. These two terms are balanced by the scalar$\beta$ ($\beta$=1.0 in some examples).

Natural emergence of silent intervals. While producing plausible denoising results (see Sec. 4.4), the end-to-end training process has no supervision on silent interval detection: the loss function (1) only accounts for the recoveries of noise and clean speech signal. But somewhat surprisingly, the ability of detecting silent intervals automatically emerges as the output of the first network component (see FIG. 3-*d* as an example, which visualizes $s_{\tilde{x}}$).

In other words, the network automatically learns to detect silent intervals for speech denoising without this supervision.

(3.3 Silent Interval Supervision)

As the model is learning to detect silent intervals on its own, we are able to directly supervise silent interval detection to further improve the denoising quality. Our first attempt was to add a term in (1) that penalizes the discrepancy between detected silent intervals and their ground truth. But our experiments show that this way is not effective (see Sec. 4.4). Instead, we train our network in two sequential steps.

First, we train the silent interval detection component through the following loss function:

$$\mathcal{L}_1 = \mathbb{E}_{x \sim p(x)}[\ell_{BCE}(m(x), m_x^*)],$$

where $l_{BCE}(\bullet,\bullet)$ is the binary cross entropy loss, m(x) is the mask resulted from silent interval detection component, and $m_x^*$ is the ground-truth label of each signal sample being silent or not-the way of constructing $m_x^*$ and the training dataset will be described in Sec. 4.1.

Next, we train the noise estimation and removal components through the loss function (1). This training step starts by neglecting the silent detection component. In the loss function (1), instead of using $m_x^*$ the noise spectrogram exposed by the estimated silent intervals, we use the spectrogram of the noise exposed by the ground-truth silent intervals (i.e., the STFT of $x \odot m_{\tilde{x}}^*$)

After training using such a loss function, we fine-tune the network components by incorporating the already trained silent interval detection component. With the silent interval detection component fixed, this fine-tuning step optimizes the original loss function (1) and thereby updates the weights of the noise estimation and removal components.

(4 Experiments)

This section presents the major evaluations of our method, comparisons to several baselines and prior works, and ablation studies. We also refer the reader to the supplementary materials (including a supplemental document and audio effects organized on an off-line webpage) for the full description of our network structure, implementation details, additional evaluations, as well as audio examples.

(4.1 Experiment Setup)

Figure 4:
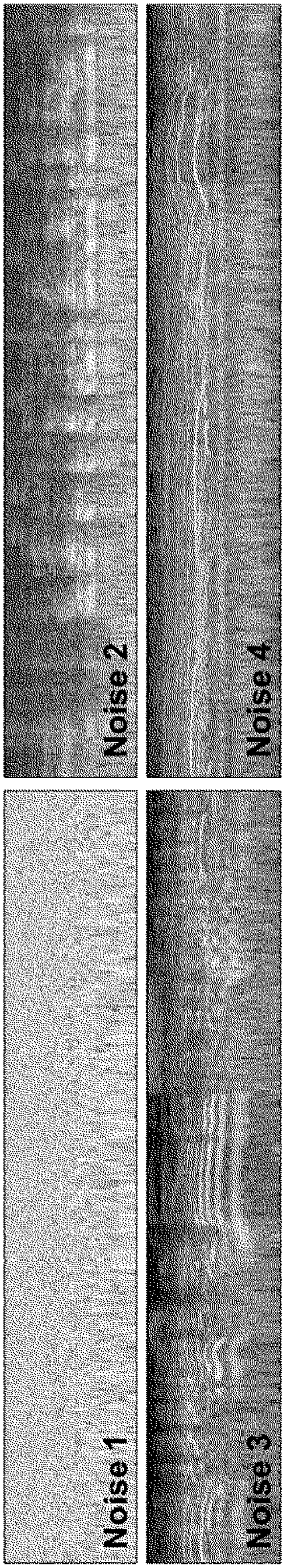

Dataset construction. To construct training and testing data, we leverage publicly available audio datasets. We obtain clean speech signals using AVSPEECH (Ref. 18), from which we randomly choose 2448 videos (4.5 hours of total length) and extract their speech audio channels. Among them, we use 2214 videos for training and 234 videos for testing, so the training and testing speeches are fully separate. All these speech videos are in English, selected on purpose: as we show in supplementary materials, our model trained on this dataset can readily denoise speeches in other languages We use two datasets, DEMAND (Ref. 82) and Google's AudioSet (Ref. 25), as background noise. Both consist of environmental noise, transportation noise, music, and many other types of noises. DEMAND has been used in previous denoising works (e.g., (Ref. 64, 28, 83)). Yet AudioSet is much larger and more diverse than DEMAND, thus more challenging when used as noise. FIG. 4 shows some noise examples. Our evaluations are conducted on both datasets, separately.

FIG. 4: Noise gallery. We show four examples of noise from the noise datasets. Noise 1) is a stationary (white) noise, and the other three are not. Noise 2) is a monologue in a meeting. Noise 3) is party noise from people speaking and laughing with background noise. Noise 4) is street noise from people shouting and screaming with additional traffic noise such as vehicles driving and honking.

Due to the linearity of acoustic wave propagation, we can superimpose clean speech signals with noise to synthesize noisy input signals (similar to previous works (Ref. 64, 28, 83)). When synthesizing a noisy input signal, we randomly choose a signal-to-noise ratio (SNR) from seven discrete values: −10 dB, −7 dB, −3 dB, 0 dB, 3 dB, 7 dB, and 10 dB; and by mixing the foreground speech with properly scaled noise, we produce a noisy signal with the chosen SNR. For example, a −10 dB SNR means that the power of noise is ten times the speech (see FIG. 7). The SNR range in our evaluations (i.e., [−10 dB, 10 dB]) is significantly larger than those tested in previous works.

To supervise our silent interval detection (recall Sec. 3.3), we need ground-truth labels of silent intervals. To this end, we divide each clean speech signal into time segments, each of which lasts 1/30 seconds. We label a time segment as silent when the total acoustic energy in that segment is below a threshold. Since the speech is clean, this automatic labeling process is robust.

Method comparison. We compare our method with several existing methods that are also designed for speech denoising, including both the classic approaches and recently proposed learning-based methods. We refer to these methods as follows: i) Ours, our model trained with silent interval supervision (recall Sec. 3.3); ii) Baseline-thres, a baseline method that uses acoustic energy threshold to label silent intervals (the same as our automatic labeling approach in Sec. 4.1 but applied on noisy input signals), and then uses our trained noise estimation and removal networks for speech denoising. iii) Ours-GTSI, another reference method that uses our trained noise estimation and removal networks, but hypothetically uses the ground-truth silent intervals; iv) Spectral Gating, the classic speech denoising algorithm based on spectral subtraction (Ref. 73); v) Adobe Audition (Ref. 37), one of the most widely used professional audio processing software, and we use its machine-learning-based noise reduction feature, provided in the latest Adobe Audition CC 2020, with default parameters to batch process all our test data; vi) SEGAN (Ref. 64), one of the state-of-the-art audio-only speech enhancement methods based on generative adversarial networks. vii) DFL (Ref. 28), a recently proposed speech denoising method based on a loss function over deep network features; 1 viii) VSE (Ref. 24), a learning-based method that takes both video and audio as input, and leverages both audio signal and mouth motions (from video footage) for speech denoising. We could not compare with another audiovisual method (Ref. 18) because no source code or executable is made publicly available.

For fair comparisons, we train all the methods (except Spectral Gating which is not learning-based and Adobe Audition which is commercially shipped as a black box) using the same datasets. For SEGAN, DFL, and VSE, we use their source codes published by the authors. The audio-visual denoising method VSE also requires video footage, which is available in AVSPEECH.

(4.2 Evaluation on Speech Denoising)

Metrics. Due to the perceptual nature of audio processing tasks, there is no widely accepted single metric for quantitative evaluation and comparisons. We therefore evaluate our method under six different metrics, all of which have been frequently used for evaluating audio processing quality. Namely, these metrics are: i) Perceptual Evaluation of Speech Quality (PESQ) (Ref. 71), ii) Segmental Signal-to-Noise Ratio (SSNR) (Ref. 76), iii) Short-Time Objective Intelligibility (STOI) (Ref. 80), iv) Mean opinion score (MOS) predictor of signal distortion (CSIG) (Ref. 35), v) MOS predictor of background-noise intrusiveness (CBAK) (Ref. 35), and vi) MOS predictor of overall signal quality (COVL) (Ref. 35).

Figure 5:
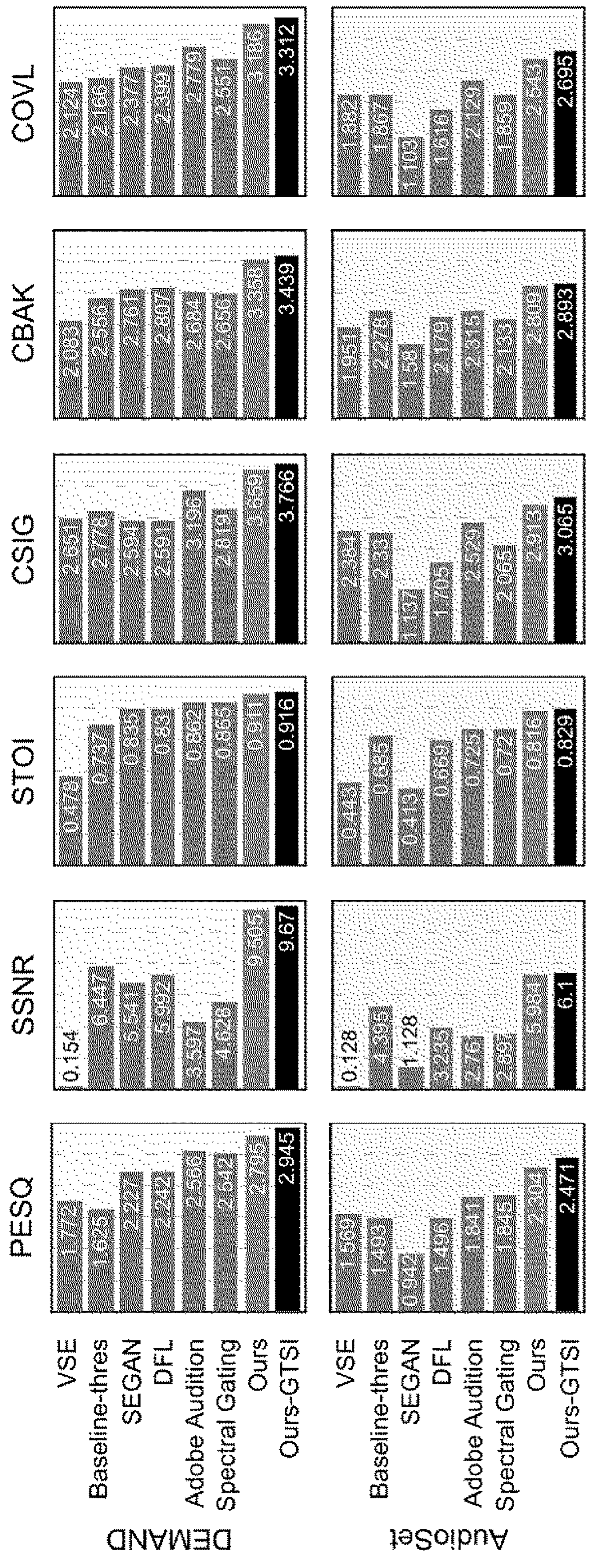

FIG. 5: Quantitative comparisons. We measure denoising quality under six metrics (corresponding to columns). The comparisons are conducted using noise from DEMAND and AudioSet separately. Ours-GTSI (in black) uses ground-truth silent intervals. Although not a practical approach, it serves as an upper-bound reference of all methods.

Figure 6:
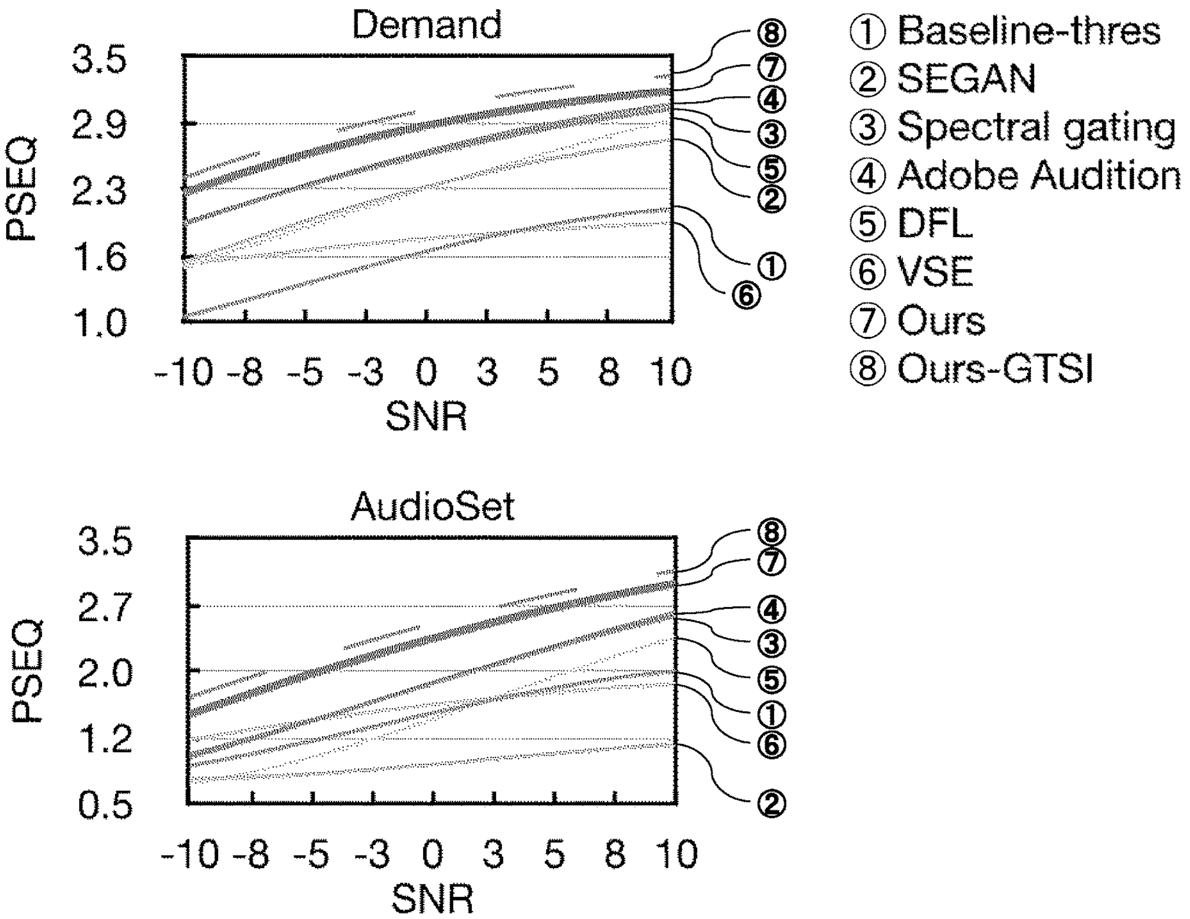
Figure 8:
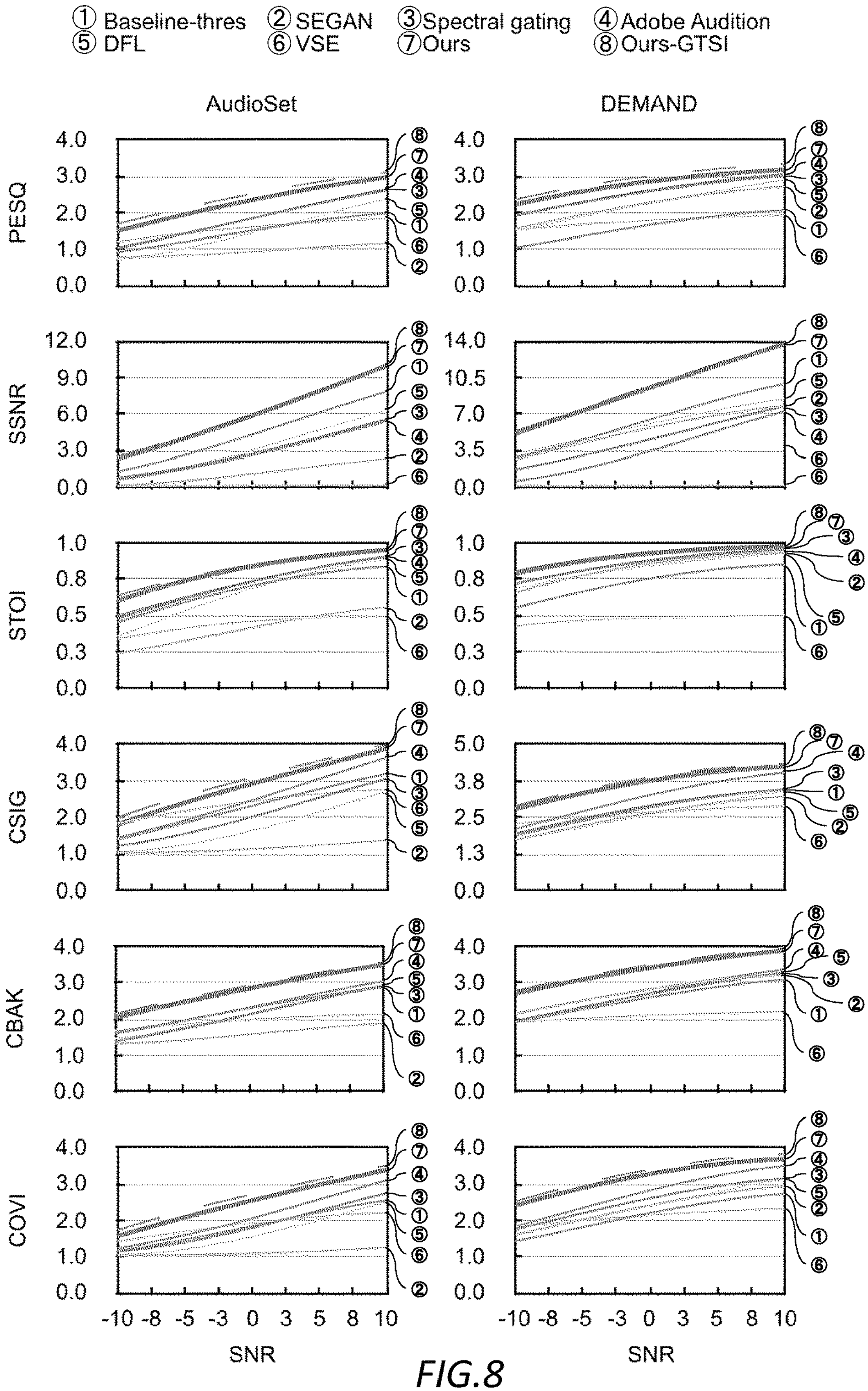

FIG. 6: Denoise quality W.r.t. input SNRs. Denoise results measured in PESQ for each method w.r.t different input SNRs. Results measured in other metrics are shown in FIG. 8.

Results. We train two separate models using DEMAND and AudioSet noise datasets respectively, and compare them with other models trained with the same datasets. We evaluate the average metric values and report them in FIG. 5. Under all metrics, our method consistently outperforms others.

We breakdown the performance of each method with respect to SNR levels from −10 dB to 10 dB on both noise datasets. The results are reported in FIG. 6 for PESQ (see FIG. 8). In the previous works that we compare to, no results under those low SNR levels (at <0 dBs) are reported. Nevertheless, across all input SNR levels, our method performs the best, showing that our approach is fairly robust to both light and extreme noise.

From FIG. 6, it is worth noting that Ours-GTSI method performs even better. Recall that this is our model but provided with ground-truth silent intervals. While not practical (due to the need of ground-truth silent intervals), Ours-GTSI confirms the importance of silent intervals for denoising: a high-quality silent interval detection helps to improve speech denoising quality.

(4.3 Evaluation on Silent Interval Detection)

Due to the importance of silent intervals for speech denoising, we also evaluate the quality of our silent interval detection, in comparison to two alternatives, the baseline Baseline-thres and a Voice Activity Detector (VAD) (Ref. 95). The former is described above, while the latter classifies each time window of an audio signal as having human voice or not (Ref. 43, 44). We use an off-the-shelf VAD, which is developed by Google's WebRTC project and reported as one of the best available.

We evaluate these methods using four standard statistic metrics: the precision, recall, F1 score, and accuracy. We follow the standard definitions of these metrics, which are summarized in C.1. These metrics are based on the definition of positive/negative conditions. Here, the positive condition indicates a time segment being labeled as a silent segment, and the negative condition indicates a non-silent label. Thus, the higher the metric values are, the better the detection approach.

Table 1 shows that, under all metrics, our method is consistently better than the alternatives. Between VAD and Baseline-thres, VAD has higher precision and lower recall, meaning that VAD is overly conservative and Baseline-thres is overly aggressive when detecting silent intervals (see FIG. 9). Our method reaches better balance and thus detects silent intervals more accurately.

TABLE 1

Results of silent interval detection. The metrics are measured using our test signals that have SNRs from −10 dB to 10 dB. Definitions of these metrics are summarized in the following C.1.

| Noise Dataset | Method | Precision | Recall | F1 | Accuracy |
|---|---|---|---|---|---|
| DEMAND | Baseline-thres | 0.533 | 0.718 | 0.612 | 0.706 |
| | VAD | 0.797 | 0.432 | 0.558 | 0.783 |
| | Ours | 0.876 | 0.866 | 0.869 | 0.918 |
| Audioset | Baseline-thres | 0.536 | 0.731 | 0.618 | 0.708 |
| | VAD | 0.736 | 0.227 | 0.338 | 0.728 |
| | Ours | 0.794 | 0.822 | 0.807 | 0.873 |

TABLE 2

Ablation studies. We alter network components and training loss, and evaluate the denoising quality under various metrics. Our proposed approach performs the best.

| Noise Dataset | Method | PESQ | SSNR | STOI | CSIG | CBAK | COVL |
|---|---|---|---|---|---|---|---|
| DEMAND | Ours w/o SID comp | 2.689 | 9.080 | 0.904 | 3.615 | 3.285 | 3.112 |
| | Ours w/o NR comp | 2.476 | 0.234 | 0.747 | 3.015 | 2.410 | 2.637 |
| | Ours w/o SID loss | 2.794 | 6.478 | 0.903 | 3.466 | 3.147 | 3.079 |
| | Ours w/o NE loss | 2.601 | 9.070 | 0.896 | 3.531 | 3.237 | 3.027 |
| | Ours Joint loss | 2.774 | 6.042 | 0.895 | 3.453 | 3.121 | 3.068 |
| | Ours | 2.795 | 9.505 | 0.911 | 3.659 | 3.358 | 3.186 |
| Audioset | Ours w/o SID comp | 2.190 | 5.574 | 0.802 | 2.851 | 2.719 | 2.454 |
| | Ours w/o NR comp | 1.803 | 0.191 | 0.623 | 2.301 | 2.070 | 1.977 |
| | Ours w/o SID Loss | 2.325 | 4.957 | 0.814 | 2.814 | 2.746 | 2.503 |
| | Ours w/o NE loss | 2.061 | 5.690 | 0.789 | 2.766 | 2.671 | 2.362 |
| | Ours Joint loss | 2.305 | 4.612 | 0.807 | 2.774 | 2.721 | 2.474 |
| | Ours | 2.304 | 5.984 | 0.816 | 2.913 | 2.809 | 2.543 |

(4.4 Ablation Studies)

In addition, we perform a series of ablation studies to understand the efficacy of individual network components and loss terms (see the following D.1 for more details). In Table 2, "Ours W/O SID loss refers to the training method presented in Sec. 3.2 (i.e., without silent interval supervision). "Ours Joint 1oss" refers to the end-to-end training approach that optimizes the loss function (1) with the additional term (2). And "Ours w/o NE loss" uses our two-step training (in Sec. 3.3) but without the loss term on noise estimation—that is, without the first term in (1). In comparison to these alternative training approaches, our two-step training with silent interval supervision (referred to as "Ours") performs the best. We also note that "Ours W/O SID 1oss"—i.e., without supervision on already outperforms the methods we compared to in FIG. 5, and "Ours further improves the denoising quality. This shows the efficacy of our proposed training approach silent interval detection We also experimented with two variants of our network structure. The first one, referred to as "Ours w/o SID comp", turns off silent interval detection: the silent interval detection component always outputs a vector with all zeros. The second, referred as "Ours w/o NR comp", uses a simple spectral subtraction to replace our noise removal component. Table 2 shows that, under all the tested metrics, both variants perform worse than our method, suggesting our proposed network structure is effective.

Furthermore, we studied to what extent the accuracy of silent interval detection affects the speech denoising quality. We show that as the silent interval detection becomes less accurate, the denoising quality degrades. Presented in details in the following D.2, these experiments reinforce our intuition that silent intervals are instructive for speech denoising tasks.

(5 Conclusion)

Speech denoising has been a long-standing challenge. We present a new network structure that leverages the abundance of silent intervals in speech. Even without silent interval supervision, our network is able to denoise speech signals plausibly, and meanwhile, the ability to detect silent intervals automatically emerges. We reinforce this ability. Our explicit supervision on silent intervals enables the network to detect them more accurately, thereby further improving the performance of speech denoising. As a result, under a variety of denoising metrics, our method consistently outperforms several state-of-the-art audio denoising models.

(Broader Impact)

High-quality speech denoising is desired in a myriad of applications: human-robot interaction, cellular communications, hearing aids, teleconferencing, music recording, filmmaking, news reporting, and surveillance systems to name a few. Therefore, we expect our proposed denoising method—be it a system used in practice or a foundation for future technology—to find impact in these applications.

In our experiments, we train our model using English speech only, to demonstrate its generalization property—the ability of denoising spoken languages beyond English. Our demonstration of denoising Japanese, Chinese, and Korean speeches is intentional: they are linguistically and phonologically distant from English (in contrast to other English "siblings" such as German and Dutch). Still, our model may bias in favour of spoken languages and cultures that are closer to English or that have frequent pauses to reveal silent intervals. Deeper understanding of this potential bias requires future studies in tandem with linguistic and socio-cultural insights.

Lastly, it is natural to extend our model for denoising audio signals in general or even signals beyond audio (such as Gravitational wave denoising (Ref. 90)). If successful, our model can bring in even broader impacts. Pursuing this extension, however, requires a judicious definition of "silent intervals". After all, the notion of "noise" in a general context of signal processing depends on specific applications: noise in one application may be another's signals. To train a neural network that exploits a general notion of silent intervals, prudence must be taken to avoid biasing toward certain types of noise.

REFERENCE (Ref. 1) A. Adeel, M. Gogate, A. Hussain, and W. M. Whitmer. Lip-reading driven deep learning approach for speech enhancement. IEEE Transactions on Emerging Topics in Computational Intelligence, page 1-10, 2019. ISSN 2471-285x. doi: 10.1109/tetci.2019.2917039. URL http://dX.doi.org/10.1109/tetci.2019.2917039.

(Ref. 2) T. Afouras, J. S. Chung, A. Senior, O. Vinyals, and A. Zisserman. Deep audio-visual speech recognition. IEEE Transactions on Pattern Analysis and Machine Intelligence, pages 1-1, 2018.

(Ref. 3) T. Afouras, J. S. Chung, and A. Zisserman. The conversation: Deep audio-visual speech enhancement. In Proc. Interspeech 2018, pages 3244-3248, 2018. doi: 10.21437/Interspeech. 2018-1400. URL http://dx.doi.org/10.21437/Interspeech.2018-1400.

(Ref. 4) R. Arandjelovic and A. Zisserman. Objects that sound. In Proceedings of the European Conference on Computer Vision (ECCV), pages 435-451, 2018.

(Ref. 5) Y. Aytar, C. Vondrick, and A. Torralba. Soundnet: Learning sound representations from unlabeled video. In Advances in neural information processing systems, pages 892-900, 2016.

(Ref. 6) M. Berouti, R. Schwartz, and J. Makhoul. Enhancement of speech corrupted by acoustic noise. In ICASSP 79. IEEE International Conference on Acoustics, Speech, and Signal Processing, volume 4, pages 208-211, 1979.

(Ref. 7) S. Boll. Suppression of acoustic noise in speech using spectral subtraction. IEEE Transactions on Acoustics, Speech, and Signal Processing, 27(2):113-120, 1979.

(Ref. 8) C. Busso and S. S. Narayanan. Interrelation between speech and facial gestures in emotional utterances: A single subject study. IEEE Transactions on Audio, Speech, and Language Processing, 15 (8):2331-2347, 2007.

(Ref. 9) J. Chen and D. Wang. Long short-term memory for speaker generalization in supervised speech separation. Acoustical Society of America Journal, 141(6):4705-4714, June 2017. doi: 10.1121/1.4 986931.

(Ref. 10) I. Cohen. Noise spectrum estimation in adverse environments: improved minima controlled recursive averaging. IEEE Transactions on Speech and Audio Processing, 11(5):466-475, 2003.

(Ref. 11) I. Cohen and B. Berdugo. Noise estimation by minima controlled recursive averaging for robust speech enhancement. IEEE Signal Processing Letters, 9(1): 12-15, 2002.

(Ref. 12) M. Dendrinos, S. Bakamidis, and G. Carayannis. Speech enhancement from noise: A regener-ative approach. Speech Commun., 10(1):45-67, February 1991. ISSN 0167-6393. doi: 10.1016/0167-63 93(91)90027-q. URL https://doi.org/10.1016/0167-6393(91)90027-0.

(Ref. 13) G. Doblinger. Computationally efficient speech enhancement by spectral minima tracking in subbands. In in Proc. Eurospeech, pages 1513-1516, 1995.

(Ref. 14) Y. Ephraim. Statistical-model-based speech enhancement systems. Proceedings of the IEEE, 80(10): 1526-1555, 1992.

(Ref. 15) Y. Ephraim and D. Malah. Speech enhancement using a minimum mean-square error log-spectral amplitude estimator. IEEE Transactions on Acoustics, Speech, and Signal Processing, 33(2):443-445, 1985.

(Ref. 16) Y. Ephraim and H. L. Van Trees. A signal subspace approach for speech enhancement. IEEE Transactions on Speech and Audio Processing, 3(4):251-266, 1995.

(Ref. 17) A. Ephrat, T. Halperin, and S. Peleg. Improved speech reconstruction from silent video. In 2017 IEEE International Conference on Computer Vision Workshops (ICCVW), pages 455-462, 2017.

(Ref. 18) A. Ephrat, I. Mosseri, O. Lang, T. Dekel, K. Wilson, A. Hassidim, W. T. Freeman, and M. Ru-binstein. Looking to listen at the cocktail party: A speaker-independent audio-visual model for speech separation. ACM Transactions on Graphics, 37(4):1-11, July 2018. ISSN 0730-0301. doi: 10.1145/319 7517.3201357. URL http://dx.doi.org/10.1145/3197517.3201357.

(Ref. 19) H. Erdogan, J. R. Hershey, S. Watanabe, and J. Le Roux. Phase-sensitive and recognition-boosted speech separation using deep recurrent neural networks. In 2015 IEEE International Conference on Acoustics, Speech and Signal Processing (ICASSP), pages 708-712, 2015.

(Ref. 20) J. L. Flanagan. Speech Analysis Synthesis and Perception. Springer-Verlag, 2nd edition, 1972. ISBN 9783662015629.

(Ref. 21) K. L. Fors. Production and perception of pauses in speech. PhD thesis, Department of Philosophy, Linguistics, and Theory of Science, University of Gothenburg, 2015.

(Ref. 22) S.-W. Fu, Y. Tsao, X. Lu, and H. Kawai. Raw waveform-based speech enhancement by fully convolutional networks. 2017 Asia-Pacific Signal and Information Processing Association Annual Summit and Conference (APSIPA ASC), December 2017. doi: 10.1109/apsipa.2017.8281993. URL http://dX.doi.org/10.1109/APSIPA.2017.8281993.

(Ref. 23) A. Gabbay, A. Ephrat, T. Halperin, and S. Peleg. Seeing through noise: Visually driven speaker separation and enhancement, 2017.

(Ref. 24) A. Gabbay, A. Shamir, and S. Peleg. Visual speech enhancement, 2017.

(Ref. 25) J. F. Gemmeke, D. P. W. Ellis, D. Freedman, A. Jansen, W. Lawrence, R. C. Moore, M. Plakal, and M. Ritter. Audio set: An ontology and human-labeled dataset for audio events. In Proc. IEEE ICA SSP 2017, New Orleans, LA, 2017.

(Ref. 26) T. Gerkmann, M. Krawczyk-Becker, and J. Le Roux. Phase processing for single-channel speech enhancement: History and recent advances. IEEE Signal Processing Magazine, 32(2): 55-66, 2015.

(Ref. 27) F. G. Germain, G. J. Mysore, and T. Fujioka. Equalization matching of speech recordings in real-world environments. In 2016 IEEE International Conference on Acoustics, Speech and Signal Processing (ICASSP), pages 609-613, 2016.

(Ref. 28) F. G. Germain, Q. Chen, and V. Koltun. Speech denoising with deep feature losses. In Proc. Interspeech 2019, pages 2723-2727, 2019. doi: 10.21437/Interspeech.2019-1924. URL http://dx.doi.org/10.21437/Interspeech.2019-1924.

(Ref. 29) L. Girin, J.-L. Schwartz, and G. Feng. Audio-visual enhancement of speech in noise. The Journal of the Acoustical Society of America, 109(6):3007-3020, 2001. doi: 10.1121/1.1358887. URL https://doi.org/10.1121/1.1358887.

(Ref. 30) M. Gogate, A. Adeel, K. Dashtipour, P. Derleth, and A. Hussain. Av speech enhancement challenge using a real noisy corpus, 2019.

(Ref. 31) I. J. Goodfellow, J. Pouget-Abadie, M. Mirza, B. Xu, D. Warde-Farley, S. Ozair, A. Courville, an d Y. Bengio. Generative adversarial nets. In Proceedings of the 27th International Conference on Neural Information Processing Systems—Volume 2, Nips' 14, page 2672-2680, Cambridge, MA, USA, 2014. MIT Press.

(Ref. 32) H.-G. Hirsch and C. Ehrlicher. Noise estimation techniques for robust speech recognition. 1995 International Conference on Acoustics, Speech, and Signal Processing, 1:153-156 vol. 1, 1995.

(Ref. 33) S. Hochreiter and J. Schmidhuber. Long short-term memory. Neural computation, 9:1735-80, December 1997. doi: 10.1162/neco.1997.9.8.1735.

(Ref. 34) J.-C. Hou, S.-S. Wang, Y.-H. Lai, Y. Tsao, H.-W. Chang, and H.-m. Wang. Audio-visual speech enhancement using multimodal deep convolutional neural networks. IEEE Transactions on Emerging Topics in Computational Intelligence, 2, March 2018. doi: 10.1109/tetci.2017.2784878.

(Ref. 35) Y. Hu and P. Loizou. Evaluation of objective quality measures for speech enhancement. Audio, Speech, and Language Processing, IEEE Transactions on, 16:229-238, February 2008. doi: 10.1109/tasl.2007.911054.

(Ref. 36) S. Iizuka, E. Simo-Serra, and H. Ishikawa. Globally and locally consistent image completion. ACM Trans. Graph., 36(4), July 2017. ISSN 0730-0301. doi: 10.1145/3072959.3073659. URL https://doi.org/10.1145/3072959.3073659.

(Ref. 37) A. Inc. Adobe audition, 2020. URL https://www.adobe.com/products/audition.html.

(Ref. 38) Jae Lim and A. Oppenheim. All-pole modeling of degraded speech. IEEE Transactions on Acoustics, Speech, and Signal Processing, 26(3):197-210, 1978.

(Ref. 39) N. Kalchbrenner, E. Elsen, K. Simonyan, S. Noury, N. Casagrande, E. Lockhart, F. Stimberg, A. van den Oord, S. Dieleman, and K. Kavukcuoglu. Efficient neural audio synthesis, 2018.

(Ref. 40) A. J. E. Kell and J. H. McDermott. Invariance to background noise as a signature of non-primary auditory cortex. Nature Communications, 10(1):3958, September 2019. ISSN 2041-1723. doi: 10.1038/541467-019-11710-y. URL https://doi.org/10.1038/s41467-019-11710-y.

(Ref. 41) A. Kumar and D. Florencio. Speech enhancement in multiple-noise conditions using deep neural networks. Interspeech 2016, September 2016. doi: 10.21437/interspeech.2016-88. URL http://dx.doi.org/10.21437/Interspeech.2016-88.

(Ref. 42) A. Kumar and D. A. F. Florencio. Speech enhancement in multiple-noise conditions using deep neural networks. In Interspeech, 2016.

(Ref. 43) R. Le Bouquin Jeannes and G. Faucon. Proposal of a voice activity detector for noise reduction. Electronics Letters, 30(12):930-932, 1994.

(Ref. 44) R. Le Bouquin Jeannes and G. Faucon. Study of a voice activity detector and its influence on a noise reduction system. Speech Communication, 16(3):245-254, 1995. ISSN 0167-6393. doi: https://doi.org/10.1016/0167-6393(94)00056-G. URL http://www.sciencedirect-.com/science/article/pii/016763939400056G.

(Ref. 45) T. Le Cornu and B. Milner. Generating intelligible audio speech from visual speech. IEEE/ACM Transactions on Audio, Speech, and Language Processing, 25(9): 1751-1761, 2017.

(Ref. 46) J. Le Roux and E. Vincent. Consistent wiener filtering for audio source separation. IEEE Signal Processing Letters, 20(3):217-220, 2013.

(Ref. 47) Z. C. Lipton, J. Berkowitz, and C. Elkan. A critical review of recurrent neural networks for sequence learning, 2015.

(Ref. 48) P. C. Loizou. Speech Enhancement: Theory and Practice. CRC Press, Inc., USA, 2nd edition, 2013. ISBN 1466504218.

(Ref. 49) X. Lu, Y. Tsao, S. Matsuda, and C. Hori. Speech enhancement based on deep denoising auto encoder. In Interspeech, 2013.

(Ref. 50) Y. Luo and N. Mesgarani. Conv-tasnet: Surpassing ideal time-frequency magnitude masking for speech separation. IEEE/ACM Trans. Audio, Speech and Lang. Proc., 27(8): 1256-1266, August 2019. ISSN 2329-9290. doi: 10.1109/taslp.2019.2915167. URL https://doi.org/10.1109/TASLP.2019.2915167.

(Ref. 51) A. L. Maas, Q. V. Le, T. M. O'Neil, O. Vinyals, P. Nguyen, and A. Y. Ng. Recurrent neural networks for noise reduction in robust asr. In Interspeech, 2012.

(Ref. 52) R. Martin. Noise power spectral density estimation based on optimal smoothing and minimum statistics. IEEE Transactions on Speech and Audio Processing, 9(5):504-512, 2001.

(Ref. 53) S. Mehri, K. Kumar, I. Gulrajani, R. Kumar, S. Jain, J. Sotelo, A. Courville, and Y. Bengio. Samplernn: An unconditional end-to-end neural audio generation model, 2016.

(Ref. 54) M. Michelashvili and L. Wolf. Audio denoising with deep network priors, 2019.

(Ref. 55) J. A. Moorer. A note on the implementation of audio processing by short-term fourier transform. In 2017 IEEE Workshop on Applications of Signal Processing to Audio and Acoustics (WASPAA), pages 156-159, 2017.

(Ref. 56) A. Narayanan and D. Wang. Ideal ratio mask estimation using deep neural networks for robust speech recognition. In 2013 IEEE International Conference on Acoustics, Speech and Signal Processing, pages 7092-7096, 2013.

(Ref. 57) K. Noda, Y. Yamaguchi, K. Nakadai, H. G. Okuno, and T. Ogata. Audio-visual speech recognition using deep learning. Applied Intelligence, 42(4):722-737, June 2015. ISSN 0924-669x. doi: 10.1007/s10489-014-0629-7. URL https://doi.org/10. 1007/s10489-014-0629-7.

(Ref. 58) A. Owens and A. A. Efros. Audio-visual scene analysis with self-supervised multisensory features. Lecture Notes in Computer Science, page 639-658, 2018. ISSN 1611-3349. doi: 10.1007/978-3-030-01231-1¥_39. URL http://dX.doi.org/10.1007/978-3-030-01231-1_39.

(Ref. 59) A. Owens, P. Isola, J. McDermott, A. Torralba, E. H. Adelson, and W. T. Freeman. Visually indicated sounds. 2016 IEEE Conference on Computer Vision and Pattern Recognition (CVPR), June 2016. doi: 10.1109/cvpr.2016.264. URL http://dx.doi.org/10.1109/CVPR.2016. 264.

(Ref. 60) A. Owens, J. Wu, J. H. McDermott, W. T. Freeman, and A. Torralba. Ambient sound provides supervision for visual learning. In European conference on computer vision, pages 801-816. Springer, 2016.

(Ref. 61) K. Paliwal, K. Wojcicki, and B. Shannon. The importance of phase in speech enhancement. Speech Commun., 53(4):465-494, April 2011. ISSN 0167-6393. doi: 10.1016/j.specom.2010. 12.003. URL https://doi.org/10.1016/j.specom.2010.12.003.

(Ref. 62) A. Pandey and D. Wang. A new framework for supervised speech enhancement in the time domain. In Proc. Interspeech 2018, pages 1136-1140, 2018. doi: 10.21437/Interspeech. 2018-1223. URL http://dx.doi.org/10.21437/Interspeech.2018-1223.

(Ref. 63) S. Parveen and P. Green. Speech enhancement with missing data techniques using recurrent neural networks. In 2004 IEEE International Conference on Acoustics, Speech, and Signal Processing, volume 1, pages 1-733, 2004.

(Ref. 64) S. Pascual, A. Bonafonte, and J. Serra. Segan: Speech enhancement generative adversarial network. In Proc. Interspeech 2017, pages 3642-3646, 2017. doi: 10.21437/Interspeech. 2017-1428. URL http://dx.doi.org/10.21437/Interspeech.2017-1428.

(Ref. 65) S. Pascual, J. Serra, and A. Bonafonte. Towards generalized speech enhancement with generative adversarial networks. In Proc. Interspeech 2019, pages 1791-1795, 2019. doi: 10.21437/Interspeech. 2019-2688. URL http://dx.doi.org/10. 21437/Interspeech. 2019-2688.

(Ref. 66) L. ping Yang and Q.-J. Fu. Spectral subtraction-based speech enhancement for cochlear implant patients in background noise. The Journal of the Acoustical Society of America, 117 3 Pt 1:1001-4, 2005.

(Ref. 67) H. Purwins, B. Li, T. Virtanen, J. Schluter, S.-Y. Chang, and T. Sainath. Deep learning for audio signal processing. IEEE Journal of Selected Topics in Signal Processing, 13(2): 206-219, May 2019. ISSN 1941-0484. doi: 10.1109/jstsp.2019.2908700. URL http://dX.doi.org/10.1109/JSTSP.2019.2908700.

(Ref. 68) K. Qian, Y. Zhang, S. Chang, X. Yang, D. Florencio, and M. Hasegawa-Johnson. Speech enhancement using bayesian wavenet. In Proc. Interspeech 2017, pages 2013-2017, 2017. doi: 10.21437/Interspeech.2017-1672. URL http://dx.doi.org/10.21437/Interspeech.2017-1672.

(Ref. 69) S. Rangachari, P. C. Loizou, and Yi Hu. A noise estimation algorithm with rapid adaptation for highly nonstationary environments. In 2004 IEEE International Conference on Acoustics, Speech, and Signal Processing, volume 1, pages 1-305, 2004.

(Ref. 70) D. Rethage, J. Pons, and X. Serra. A wavenet for speech denoising. In 2018 IEEE International Conference on Acoustics, Speech and Signal Processing (ICASSP), pages 5069-5073, 2018.

(Ref. 71) A. Rix, J. Beerends, M. Hollier, and A. Hekstra. Perceptual evaluation of speech quality (pesq): A new method for speech quality assessment of telephone networks and codecs. In 2001 IEEE International Conference on Acoustics, Speech, and Signal Processing. Proceedings (Cat. No. 01 CH37221), volume 2, pages 749-752 vol. 2, February 2001. ISBN 0-7803-7041-4. doi: 10.1109/icassp.2001.941023.

(Ref. 72) S. R. Rochester. The significance of pauses in spontaneous speech. Journal of Psycholinguistic Research, 2(1):51-81, 1973.

(Ref. 73) T. Sainburg. Noise reduction in python using spectral gating. https://github.com/timsainb/noisereduce, 2019.

(Ref. 74) P. Scalart and J. V. Filho. Speech enhancement based on a priori signal to noise estimation. In 1996 IEEE International Conference on Acoustics, Speech, and Signal Processing Conference Proceedings, volume 2, pages 629-632 vol. 2, 1996.

(Ref. 75) M. Schuster and K. Paliwal. Bidirectional recurrent neural networks. Signal Processing, IEEE Transactions on, 4532673-2681, 12 1997. doi: 10.1109/78.650093.

(Ref. 76) M. A. C. Schuyler R. Quackenbush, Thomas P. Barnwell. Objective Measures Of Speech Quality. Prentice Hall, Englewood Cliffs, NJ, 1988. ISBN 9780136290568.

(Ref. 77) E. Sejdic, I. Djurovic, and L. Stankovic. Quantitative performance analysis of scalogram as instantaneous frequency estimator. IEEE Transactions on Signal Processing, 56(8):3837-3845, 2008.

(Ref. 78) P. Smaragdis, C. Fevotte, G. J. Mysore, N. Mohammadiha, and M. Hoffman. Static and dynamic source separation using nonnegative factorizations: A unified view. IEEE Signal Processing Magazine, 31(3): 66-75, 2014.

(Ref. 79) K. V. Sorensen and S. V. Andersen. Speech enhancement with natural sounding residual noise based on connected time-frequency speech presence regions. EURASIP J. Adv. Signal Process, 2005:2954-2964, January 2005. ISSN 1110-8657. doi: 10.1155/asp.2005.2954. URL https://doi.org/10.1155/ASP.2005.2954.

(Ref. 80) C. Taal, R. Hendriks, R. Heusdens, and J. Jensen. A short-time objective intelligibility measure for time-frequency weighted noisy speech. In 2010 IEEE International Conference on Acoustics, Speech and Signal Processing, pages 4214-4217, 04 2010. doi: 10.1109/icassp.2010.5495701.

(Ref. 81) S. Tamura and A. Waibel. Noise reduction using connectionist models. In ICASSP-88., International Conference on Acoustics, Speech, and Signal Processing, pages 553-556 vol. 1, 1988.

(Ref. 82) J. Thiemann, N. Ito, and E. Vincent. The diverse environments multi-channel acoustic noise database (demand): A database of multichannel environmental noise recordings. In 21st International Congress on Acoustics, Montreal, Canada, June 2013. Acoustical Society of America. doi: 10.5281/zenodo.1227120. URL https://hal.inria.fr/ha1-00796707. The dataset itself is archived on Zenodo, with DOI 10.5281/zenodo.1227120.

(Ref. 83) C. Valentini-Botinhao, X. Wang, S. Takaki, and J. Yamagishi. Investigating rnn-based speech enhancement methods for noise-robust text-to-speech. In 9th ISCA Speech Synthesis Workshop, pages 146-152, 2016. doi: 10.21437/ssw.2016-24. URL http://dx.doi.org/10.21437/SSW.2016-24.

(Ref. 84) A. van den Oord, S. Dieleman, H. Zen, K. Simonyan, O. Vinyals, A. Graves, N. Kalchbrenner, A. W. Senior, and K. Kavukcuoglu. Wavenet: A generative model for raw audio. ArXiv, abs/1609.03499, 2016.

(Ref. 85) D. Wang and J. Chen. Supervised speech separation based on deep learning: An overview. IEEE/ACM Transactions on Audio, Speech, and Language Processing, 26(10): 1702-1726, October 2018. ISSN 2329-9304. doi: 10.1109/taslp.2018.2842159. URL http://dx.doi.org/10.1109/TASLP.2018.2842159.

(Ref. 86) D. Wang and Jae Lim. The unimportance of phase in speech enhancement. IEEE Transactions on Acoustics, Speech, and Signal Processing, 30(4):679-681, 1982.

(Ref. 87) Y. Wang and D. Wang. Cocktail party processing via structured prediction. In Proceedings of the 25th International Conference on Neural Information Processing Systems—Volume 1, Nips' 12, page 224-232, Red Hook, NY, USA, 2012. Curran Associates Inc.

(Ref. 88) Y. Wang and D. Wang. A deep neural network for time-domain signal reconstruction. In 2015 IEEE International Conference on Acoustics, Speech and Signal Processing (ICASSP), pages 4390-4394, 2015.

(Ref. 89) Y. Wang, A. Narayanan, and D. Wang. On training targets for supervised speech separation. IEEE/ACM Transactions on Audio, Speech, and Language Processing, 22(12):1849-1858, 2014.

(Ref. 90) W. Wei and E. Huerta. Gravitational wave denoising of binary black hole mergers with deep learning. Physics Letters B, 800: 135081, 2020.

(Ref. 91) M. R. Weiss, E. Aschkenasy, and T. W. Parsons. Study and development of the intel technique for improving speech intelligibility. Technical report nsc-fr/4023, Nicolet Scientific Corporation, 1974.

(Ref. 92) F. Weninger, J. R. Hershey, J. Le Roux, and B. Schuller. Discriminatively trained recurrent neural networks for single-channel speech separation. In 2014 IEEE Global Conference on Signal and Information Processing (GlobalSIP), pages 577-581, 2014.

(Ref. 93) F. Weninger, H. Erdogan, S. Watanabe, E. Vincent, J. Roux, J. R. Hershey, and B. Schuller. Speech enhancement with Istm recurrent neural networks and its application to noise-robust asr. In Proceedings ofthe 12th International Conference on Latent Variable Analysis and Signal Separation—Volume 9237, Lva/ica 2015, page 91-99, Berlin, Heidelberg, 2015. Springer-Verlag. ISBN 9783319224817. doi: 10.1007/978-3-319-22482-4_11. URL https://doi.org/10.1007/978-3-319-22482-4_11.

(Ref. 94) D. S. Williamson and D. Wang. Time-frequency masking in the complex domain for speech dereverberation and denoising. IEEE/ACM Transactions on Audio, Speech, and Language Processing, 25(7):1492-1501, 2017.

(Ref. 95) J. Wiseman. Py-webrtcvad. https://github.com/wiseman/py-webrtcvad, 2019.

(Ref. 96) L. Wyse. Audio spectrogram representations for processing with convolutional neural networks, 2017.

(Ref. 97) Y. Xu, J. Du, L. Dai, and C. Lee. An experimental study on speech enhancement based on deep neural networks. IEEE Signal Processing Letters, 21(1):65-68, 2014.

(Ref. 98) Y. Xu, J. Du, L. Dai, and C. Lee. A regression approach to speech enhancement based on deep neural networks. IEEE/ACM Transactions on Audio, Speech, and Language Processing, 23(1): 7-19, 2015.

(Ref. 99) Y. Xu, J. Du, Z. Huang, L.-R. Dai, and C.-H. Lee. Multi-objective learning and mask-based post-processing for deep neural network based speech enhancement. In Interspeech, 2015.

(Ref. 100) X. Zhang and D. Wang. A deep ensemble learning method for monaural speech separation. IEEE/ACM Transactions on Audio, Speech, and Language Processing, 24(5):967-977, 2016.

(Ref. 101) Z. Zhang, Y. Wang, C. Gan, J. Wu, J. B. Tenenbaum, A. Torralba, and W. T. Freeman. Deep audio priors emerge from harmonic convolutional networks. In International Conference on Learning Representations, 2020. URL https://openreview.net/forum id=rygjHXrYDB.

(Ref. 102) H. Zhao, C. Gan, A. Rouditchenko, C. Vondrick, J. McDermott, and A. Torralba. The sound of pixels. In Proceedings of the European Conference on Computer Vision (ECCV), pages 570-586, 2018.

(Supplementary Document Listening to Sounds of Silence for Speech Denoising)

(A: Network Structure and Training Details)

We now present the details of our network structure and training configurations.

The silent interval detection component of our model is composed of 2D convolutional layers, a bidirectional LSTM, and two FC layers. The parameters of the convolutional layers are shown in Table 3. Each convolutional layer is followed by a batch normalization layer with a ReLU activation function. The hidden size of bidirectional LSTM is 100. The two FC layers, interleaved with a ReLU activation function, have hidden size of 100 and 1, respectively.

TABLE 3

| | conv1 | conv2 | conv3 | conv4 | conv5 | conv6 | conv7 | conv8 | conv9 | conv10 | conv11 | conv12 |
|---|---|---|---|---|---|---|---|---|---|---|---|---|
| Num Filters | 48 | 48 | 48 | 48 | 48 | 48 | 48 | 48 | 48 | 48 | 48 | 8 |
| Filter Size | (1.7) | (7.1) | (5.5) | (5.5) | (5.5) | (5.5) | (5.5) | (5.5) | (5.5) | (5.5) | (5.5) | (1.1) |
| Dilation | (1.1) | (1.1) | (1.1) | (2.1) | (4.1) | (8.1) | (16.1) | (32.1) | (1.0) | (2.2) | (4.4) | (1.1) |
| Stride | 1 | 1 | 1 | 1 | 1 | 1 | 1 | 1 | 1 | 1 | 1 | 1 |

The noise estimation component of our model is fully convolutional, consisting of two encoders and one decoder. The two encoders process the noisy signal and the incomplete noise profile, respectively; they have the same architecture (shown in Table 4) but different weights. The two feature maps resulted from the two encoders are concatenated in a channel-wise manner before feeding into the decoder. In Table 4, every layer, except the last one, is followed by a batch normalization layer together with a ReLU activation function. In addition, there is skip connections between the 2nd and 14-th layer and between the 4-th and 12-th layer.

TABLE 4

Architecture of noise estimation component. ‘C’ indicates a convolutional layer, and ‘TC’ indicates a transposed convolutional layer.

| | Encoder | | | Decoder | | | | | | | | | | | | |
|---|---|---|---|---|---|---|---|---|---|---|---|---|---|---|---|---|
| ID | 1 | 2 | 3 | 4 | 5 | 6 | 7 | 8 | 9 | 10 | 11 | 12 | 13 | 14 | 15 | 16 |
| Layer Type | C | C | C | C | C | C | C | C | C | C | C | TC | C | TC | C | C |
| Num Filters | 64 | 128 | 128 | 256 | 256 | 256 | 256 | 256 | 256 | 256 | 256 | 128 | 128 | 64 | 64 | 2 |
| Filter Size | 5 | 5 | 5 | 3 | 3 | 3 | 3 | 3 | 3 | 3 | 3 | 3 | 3 | 3 | 3 | 3 |
| Dilation | 1 | 1 | 1 | 1 | 1 | 2 | 4 | 8 | 16 | 1 | 1 | 1 | 1 | 1 | 1 | 1 |
| Stride | 1 | 2 | 1 | 2 | 1 | 1 | 1 | 1 | 1 | 1 | 1 | 2 | 1 | 2 | 1 | 1 |

The noise removal component of our model is composed of two 2D convolutional encoders, a bidirectional LSTM, and three FC layers. The two convolutional encoders take as input the input audio spectrogram $S_x$ and the estimated full noise spectrogram $N(s_x, s_{\tilde{x}})$, respectively. The first encoder has the network architecture listed in Table 5, and the second has the same architecture but with half of the number of filters at each convolutional layer. Moreover, the bidirectional LSTM has the hidden size of 200, and the three FC layers have the hidden size of 600, 600, and 2F, respectively, where F is the number of frequency bins in the spectrogram. In terms of the activation function, ReLU is used after each layer except the last layer, which uses sigmoid.

TABLE 5

Convolutional encoder for the noise removal component of our model. Each convolutional layer is followed by a batch normalization layer with ReLU as the activation function.

| | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|
| Num Filters | 96 | 96 | 96 | 96 | 96 | 96 | 96 | 96 | 96 | 96 | 96 | 96 | 96 | 96 | 8 |
| Filter Size | (1.7) | (7.1) | (5.5) | (5.5) | (5.5) | (5.5) | (5.5) | (5.5) | (5.5) | (5.5) | (5.5) | (5.5) | (5.5) | (5.5) | (1.1) |
| Dilation | (1.1) | (1.1) | (1.1) | (2.1) | (4.1) | (8.1) | (16.1) | (32.1) | (1.1) | (2.2) | (4.4) | (8.8) | (16.16) | (32.32) | (1.1) |
| Stride | 1 | 1 | 1 | 1 | 1 | 1 | 1 | 1 | 1 | 1 | 1 | 1 | 1 | 1 | 1 |

Figure 7:
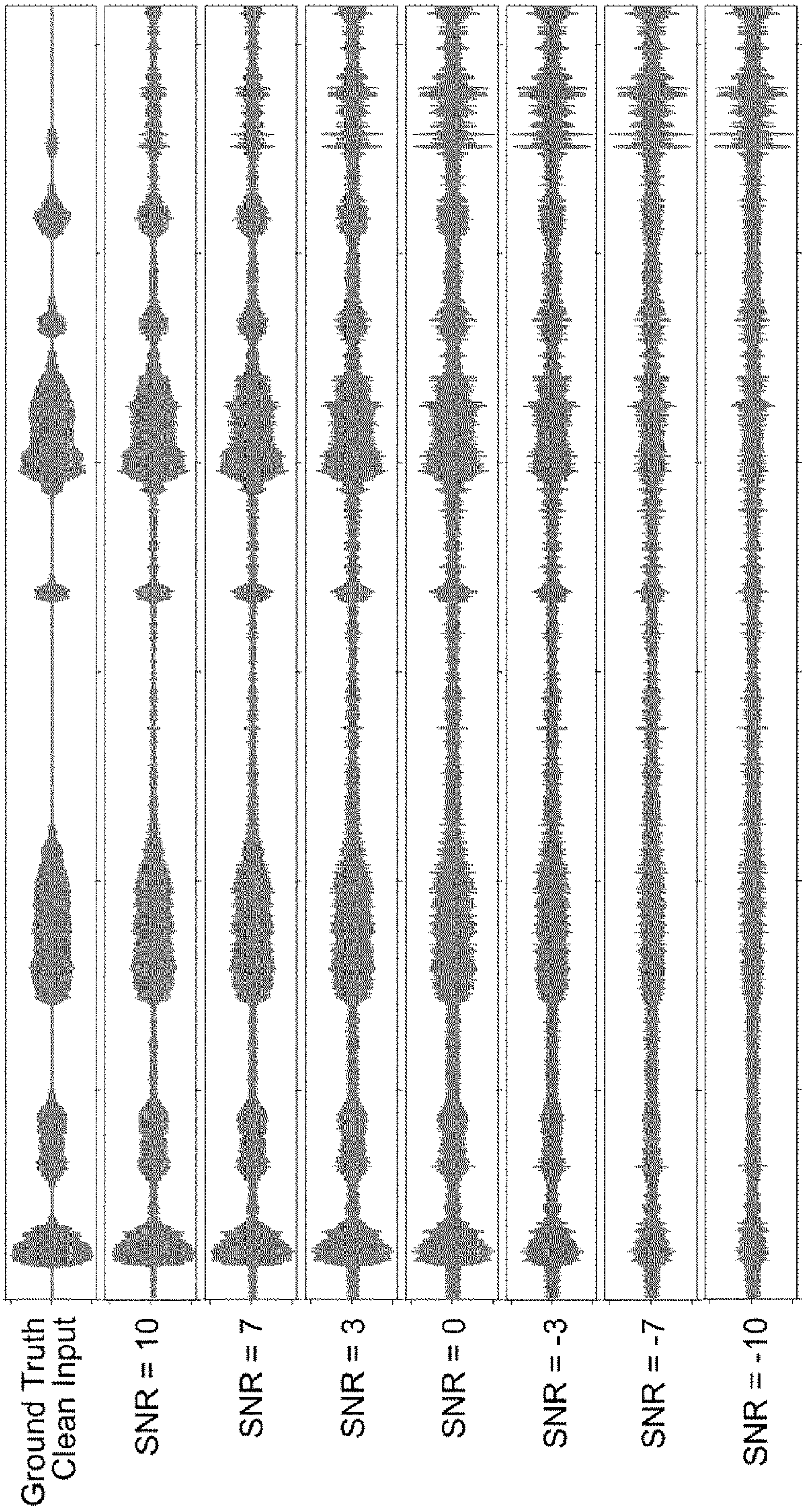

FIG. 7: Constructed noisy audio based on different SNR levels. The first row shows the waveform of the ground truth clean input.

Training details. We use PyTorch platform to implement our speech denoising model, which is then trained with the Adam optimizer. In our end-to-end training without silent interval supervision (referred to as "Ours W/O SID loss" in Sec. 4; also recall Sec. 3.2), we run the Adam optimizer for 50 epochs with a batch size of 20 and a learning rate of 0.001. When the silent interval supervision is incorporated (recall Sec. 3.3), we first train the silent interval detection component with the following setup: run the Adam optimizer for 100 epochs with a batch size of 15 and a learning rate of 0.001. Afterwards, we train the noise estimation and removal components using the same setup as the end-to-end training of "Ours w/o SID 1oss".

(B: Data Processing Details)

Our model is designed to take as input a mono-channel audio clip of an arbitrary length. However, when constructing the training dataset, we set each audio clip in the training dataset to have the same 2-second length, to enable batching at training time. To this end, we split each original audio clip from AVSPEECH, DEMAND, and AudioSet into 2-second long clips. All audio clips are then downsampled at 16 kHz before converting into spectrograms using STFT. To perform STFT, the Fast Fourier Transform (FFT) size is set to 510, the Hann window size is set to 28 ms, and the hop length is set to 11 ms. As a result, each 2-second clip yields a (complex-valued) spectrogram with a resolution 256×178, where 256 is the number of frequency bins, and 178 is the temporal resolution. At inference time, our model can still accept audio clips with arbitrary length.

Both our clean speech dataset and noise datasets are first split into training and test sets, so that no audio clips in training and testing are from the same original audio source-they are fully separate.

To supervise our silent interval detection, we label the clean audio signals in the following way. We first normalize each audio clip so that its magnitude is in the range [−1,1], that is, ensuring the largest waveform magnitude at −1 or 1. Then, the clean audio clip is divided into segments of length 1/30 seconds. We label a time segment as a "silent" segment (i.e., label 0) if its average waveform energy in that segment is below 0.08. Otherwise, it is labeled as a "non-silent" segment (i.e., label 1).

(C: Evaluation on Silent Interval Detection)

(C.1: Metrics)

We now provide the details of the metrics used for evaluating our silent interval detection (i.e., results in Table 1). Detecting silent intervals is a binary classification task, one that classifies every time segment as being silent (i.e., a positive condition) or not (i.e., a negative condition). Recall that the confusion matrix in a binary classification task is as follows:

TABLE 6

| Confusion matrix | | | |
|---|---|---|---|
| | | Actual | |
| | | Positive | Negative |
| Predicted | Positive | True Positive (TP) | False Positive (FP) |
| | Negative | False Negative (FN) | True Negative (TN) |

In our case, we have the following conditions:

A true positive (TP) sample is a correctly predicted silent segment.

A true negative (TN) sample is a correctly predicted non-silent segment.

A false positive (FP) sample is a non-silent segment predicted as silent.

A false negative (FN) sample is a silent segment predicted as non-silent.

The four metrics used in Table 1 follow the standard definitions in statistics, which we review here:

$$\text{precision} = \frac{N_{TP}}{N_{TP}+N_{FP}},\quad \text{recall} = \frac{N_{TP}}{N_{TP}+N_{FN}},\quad F1 = 2\cdot\frac{\text{precision}\cdot\text{recall}}{\text{precision}+\text{recall}},\ \text{and}\quad \text{accuracy} = \frac{N_{TP}+N_{TN}}{N_{TP}+N_{TN}+N_{FP}+N_{FN}},\qquad \text{[Math. 1]}$$

where $N_{TP}$, $N_{TN}$, $N_{FP}$, and $N_{FN}$ indicate the numbers of true positive, true negative, false positive, and false negative predictions among all tests. Intuitively, recall indicates the ability of correctly finding all true silent intervals, precision measures how much proportion of the labeled silent intervals are truly silent. F1 score takes both precision and recall into account, and produces their harmonic mean. And accuracy is the ratio of correct predictions among all predictions.

(C.2: An Example of Silent Interval Detection)

Figure 9:
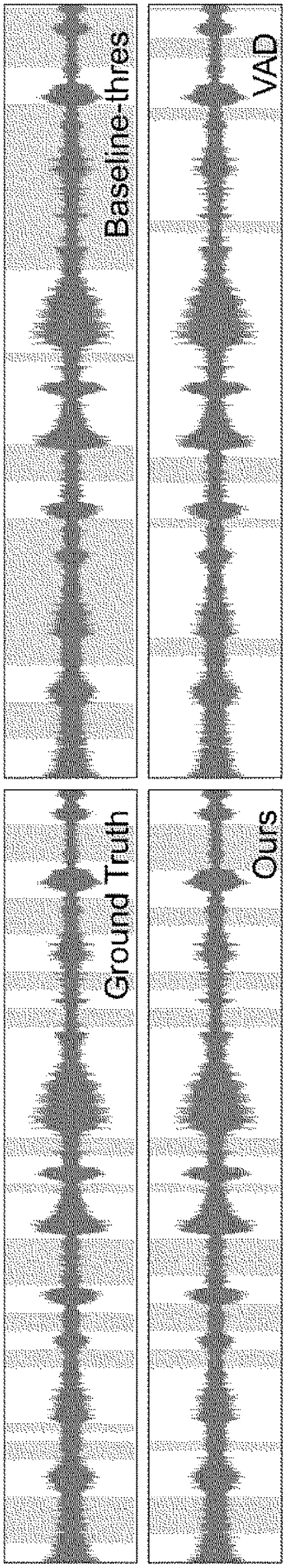

In FIG. 9, we present an example of silent interval detection results in comparison to two alternative methods. The two alternatives, described in Sec. 4.3, are referred to as Baseline-thres and VAD, respectively. FIG. 9 echos the quantitative results in Table 1: VAD tends to be overly conservative, even in the presence of mild noise; and many silent intervals are ignored. On the other hand, Baseline-thres tends to be too aggressive; it produces many false intervals. In contrast, our silent interval detection maintains a better balance, and thus predicts more accurately.

FIG. 9: An example of silent interval detection results. Provided an input signal whose SNR is 0 dB (top-left), we show the silent intervals (in red) detected by three approaches: our method, Baseline-thres, and VAD. We also show ground-truth silent intervals in top-left.

(D: Ablation Studies and Analysis)

(D.1: Details of Ablation Studies)

In Sec. 4.4 and Table 2, the ablation studies are set up in the following way. "Ours" refers to our proposed network structure and training method that incorporates silent interval supervision (recall Sec. 3.3). Details are described in A. "Ours w/o SID loss" refers to our proposed network structure but optimized by the training method in Sec. 3.2 (i.e. an end-to-end training without silent interval supervision). This ablation study is to confirm that silent interval supervision indeed helps to improve the denoising quality. "Ours Joint 1oss" refers to our proposed network structure optimized by the end-to-end training approach that optimizes the loss function (1) with the additional term (2). In this end-to-end training, silent interval detection is also supervised through the loss function. This ablation study is to confirm that our two-step training (Sec. 3.3) is more effective. "Ours w/o NE 1oss" uses our two-step training (in Sec. 3.3) but without the loss term on noise estimation—that is, without the first term in (1). This ablation study is to examine the necessity of the loss term on noise estimation for better denoising quality. "Ours w/o SID comp" turns off silent interval detection: the silent interval detection component always outputs a vector with all zeros. As a result, the input noise profile to the noise estimation component N is made precisely the same as the original noisy signal. This ablation study is to examine the effect of silent intervals for speech denoising. "Ours w/o NR comp" uses a simple spectral subtraction to replace our noise removal component; the other components remain unchanged. This ablation study is to examine the efficacy of our noise removal component.

(D.2: The Influence of Silent Interval Detection on Denoising Quality)

A key insight of our neural-network-based denoising model is the leverage of silent interval distribution over time. The experiments above have confirmed the efficacy of our silent interval detection for better speech denoising. We now report additional experiments, aiming to gain some empirical understanding of how the quality of silent interval prediction would affect speech denoising quality.

First, starting with ground-truth silent intervals, we shift them on the time axis by 1/30, 1/10, 1/6, and 1/2 seconds. As the shifted time amount increases, more time segments become incorrectly labeled: both the numbers of false positive labels (i.e., non-silent time segments labeled silent) and false negative labels (i.e., silent time segments are labeled non-silent) increase. After each shift, we feed the silent interval labels to our noise estimation and removal components and measure the denoising quality under the PESQ score.

In the second experiment, we again start with ground-truth silent intervals; but instead of shifting them, we shrink each silent interval toward its center by 20%, 40%, 60%, and 80%. As the silent intervals become more shrunken, fewer time segments are labeled as silent. In other words, only the number of false negative predictions increases. Similar to the previous experiment, after each shrink, we use the silent interval labels in our speech denoising pipeline, and measure the PESQ score.

The results of both experiments are reported in Table S5. As we shrink the silent intervals, the denoising quality drops gently. In contrast, even a small amount of shift causes a clear drop of denoising quality. These results suggest that in comparison to false negative predictions, false positive predictions affect the denoising quality more negatively. On the one hand, reasonably conservative predictions may leave certain silent time segments undetected (i.e., introducing some false negative labels), but the detected silent intervals indeed reveal the noise profile. On the other hand, even a small amount of false positive predictions causes certain non-silent time segments to be treated as silent segments, and thus the observed noise profile through the detected silent intervals would be tainted by foreground signals.

What is claimed is:

1. A method comprising:

receiving an audio signal representation;

detecting in the received audio signal representation, using a first learning model, one or more silent intervals with reduced foreground sound levels;

determining based on the detected one or more silent intervals an estimated full noise profile corresponding to the audio signal representation; and generating with a second learning model, based on the received audio signal representation and on the determined estimated full noise profile, a resultant audio signal representation with a reduced noise level.

2. The method of claim I, wherein detecting using the first learning model the one or more silent intervals comprises:

segmenting the audio signal representation into multiple segments, each segment being shorter than an interval length of the received audio signal representation;

transforming the multiple segments into a time-frequency representation; and processing the time-frequency representation of the multiple segments using a first learning machine, implementing the first learning model, to produce a noise vector that includes, for each of the multiple segments, a confidence value representative of a likelihood that the respective one of the multiple segments is a silent interval.

3. The method of claim 2, wherein processing the time-frequency representation comprises:

encoding the time-frequency representation of the multiple segment with a 2D convolutional encoder to a generate a 2D feature map;

applying a learning network structure, comprising at least a bidirectional long short-term memory (LSTM) structure, to the 2D feature map to produce a silence vector;

determining a noise mask from the silence vector; and generating based on the audio signal representation and the noise mask a partial noise profile for the audio signal representation.

4. The method of claim 1, wherein determining the estimated full noise profile comprises:

generating a partial noise profile representative of time-frequency characteristics of the detected one or more silent intervals;

transforming the audio signal representation and the partial noise profile into respective time-frequency representations;

applying convolutional encoding to the time-frequency representations of the audio signal representation and the partial noise profile to produce an encoded audio signal representation and encoded partial noise profile; and combining the encoded audio signal representation and the encoded partial noise profile to produce the estimated full noise profile.

5. The method of claim 1, wherein generating the resultant audio signal representation with the reduced noise level comprises:

generating time-frequency representations for the audio signal representation and the estimated full noise profile; and applying the second learning model to the time-frequency representations for the audio signal representation and the estimated full noise profile to generate the resultant audio signal representation.

6. The method of claim 5, wherein the second learning model is implemented with a bidirectional long short-term memory (LSTM) structure.

7. A system comprising:

a receiver unit to receive an audio signal representation; and a controller, implementing one or more learning engines, in communication with the receiver unit and a memory device to store programmable instructions, to:

detect in the received audio signal representation, using a first learning model, one or more silent intervals with reduced foreground sound levels;

determine based on the detected one or more silent intervals an estimated full noise profile corresponding to the audio signal representation; and generate with a second learning model, based on the received audio signal representation and on the determined estimated full noise profile, a resultant audio signal representation with a reduced noise level.

8. A non-transitory computer readable media storing a set of instructions, executable on at least one programmable device, to:

receive an audio signal representation;

detect in the received audio signal representation, using a first learning model, one or more silent intervals with reduced foreground sound levels;

determine based on the detected one or more silent intervals an estimated full noise profile corresponding to the audio signal representation; and generate with a second learning model, based on the received audio signal representation and on the determined estimated full noise profile, a resultant audio signal representation with a reduced noise level.

* * * * *